US009395440B2

(12) United States Patent
Schrey et al.

(10) Patent No.: US 9,395,440 B2
(45) Date of Patent: Jul. 19, 2016

(54) OPTICAL DISTANCE MEASURING DEVICE AND METHOD FOR OPTICAL DISTANCE MEASUREMENT

(75) Inventors: Olaf Schrey, Ratingen (DE); Werner Brockherde, Duisberg (DE); Bedrich Hosticka, Muehleim (DE); Wiebke Ulfig, Muehlheim (DE)

(73) Assignee: Volkswagen Aktiengesellschaft, Wolfsburg (DE)

( * ) Notice: Subject to any disclaimer, the term of this patent is extended or adjusted under 35 U.S.C. 154(b) by 1479 days.

(21) Appl. No.: 12/937,948

(22) PCT Filed: Apr. 7, 2009

(86) PCT No.: PCT/EP2009/002570
§ 371 (c)(1),
(2), (4) Date: Jan. 5, 2011

(87) PCT Pub. No.: WO2009/127347
PCT Pub. Date: Oct. 22, 2009

(65) Prior Publication Data
US 2012/0268727 A1 Oct. 25, 2012

(30) Foreign Application Priority Data
Apr. 14, 2008 (DE) .................. 10 2008 018 718

(51) Int. Cl.
*G01C 3/08* (2006.01)
*H01J 40/14* (2006.01)
(Continued)

(52) U.S. Cl.
CPC ............... *G01S 17/107* (2013.01); *G01S 7/487* (2013.01); *G01S 17/89* (2013.01)

(58) Field of Classification Search
CPC .................................. G01C 3/08; H01J 40/14
USPC ........................................................ 356/4.01
See application file for complete search history.

(56) References Cited

U.S. PATENT DOCUMENTS 4,129,780 A 12/1978 Laughlin
5,852,492 A 12/1998 Nimblett et al.
(Continued)

FOREIGN PATENT DOCUMENTS

EP 104366 B1 4/1986
WO WO99/34235 7/1999
(Continued)

OTHER PUBLICATIONS

Schrey, O.M. et al.; "A 4x64 Pixel CMOS Image Sensor for 3D Measurement Applications"; Sep. 16-18, 2003, IEEE European Solid-State Circuits, ESSRIC '03, Piscataway, NJ, USA, pp. 333-336, XP010677477.
(Continued)

*Primary Examiner* — Luke Ratcliffe
*Assistant Examiner* — Vicente Rodriguez
(74) *Attorney, Agent, or Firm* — Perkins Coie LLP; Michael A. Glenn

(57) ABSTRACT

The present invention describes an optical distance measuring device having a pulsed radiation source that is implemented to transmit, in a temporally contiguous radiation pulse period, a radiation pulse having a pulse duration $t_p$ that is shorter than the radiation pulse period, and to transmit no radiation pulse in a temporally contiguous dark period. Further, the optical distance measuring device includes a detector for detecting different amounts of radiation in two overlapping detection periods during the radiation pulse period to capture reflections of the radiation pulse at an object surface and a background radiation and/or in two overlapping detection periods during the dark period to capture background radiation. The optical distance measuring device further includes an evaluator determining a signal depending on a distance of the optical distance measuring device to an object based on the detected amount of radiation. Further, the present invention provides a method for optical distance measurement and for multiple sampling.

24 Claims, 15 Drawing Sheets

(51) Int. Cl.
*G01S 17/10* (2006.01)
*G01S 7/487* (2006.01)
*G01S 17/89* (2006.01)

(56) References Cited

U.S. PATENT DOCUMENTS

| | | | |
|---|---|---|---|
| 6,373,557 B1 * | 4/2002 | Mengel et al. | 356/4.07 |
| 6,452,666 B1 * | 9/2002 | Barna et al. | 356/5.01 |
| 7,009,690 B2 * | 3/2006 | Kamon et al. | 356/3 |
| 7,095,487 B2 * | 8/2006 | Gonzalez-Banos et al. | 356/4.07 |
| 7,554,652 B1 * | 6/2009 | Babin et al. | 356/5.03 |
| 2011/0304841 A1 * | 12/2011 | Bamji et al. | 356/5.01 |

FOREIGN PATENT DOCUMENTS

| | | |
|---|---|---|
| WO | WO2005/052633 | 6/2005 |
| WO | WO2007/031102 | 3/2007 |

OTHER PUBLICATIONS

English Translation of the International Preliminary Report on Patentability mailed Nov. 18, 2010 in parallel PCT application PCT/EP2009/002570, 8 pages

* cited by examiner

OPTICAL DISTANCE MEASURING DEVICE AND METHOD FOR OPTICAL DISTANCE MEASUREMENT

CROSS-REFERENCE TO RELATED APPLICATION

This application is a U.S. National Phase entry of PCT/EP2009/002570 filed Apr. 7, 2009, and claims priority to German Patent Application No. 10 2008 018718.6 filed Apr. 14, 2008, each of which is incorporated herein by references hereto.

BACKGROUND OF THE INVENTION

The present invention relates to an optical distance measuring device and a method for optical distance measurement, as used, for example, in 3D cameras.

The technical field of application of the present invention is manifold, as will be described below. Complementary metal oxide semiconductor (CMOS) image sensor technology provides effective options for recording measurement signals in real time at high speed. This is of great importance when capturing three-dimensional (3D) distance images. Pulse runtime methods and methods with continuously modulated light serve here for contactless depth detection. For this, the residual intensity of an infrared laser light reflected by an object is measured. This is also referred to as 3D distance measurement.

Typical applications where optical distance measurement can be used are, for example, three-dimensional inspection/positioning systems, one-dimensional positioning systems, such as high-rack warehouses or filling systems, in the automotive field: systems for automobile interior surveillance, for airbag control, anti-theft systems, lane detection systems, so-called pre-crash sensor technology systems, pedestrian protection or parking assist systems. It is also possible to use optical distance measurement for topographical survey or for the detection of persons or for presence sensor technology. Further fields of application are traffic monitoring/counting, logistics, industrial automation or monitoring of different (danger) areas.

In particular in intelligent airbag release and lane detection, high reliability requirements exist for the distance measurement system. In intelligent airbag control systems, for example, the task of releasing the airbag with delayed intensity has to be solved in dependence on the distance of the passenger. Lane detection has to operate reliably also in fog, darkness, bad weather conditions and extreme situations with oncoming light. This is possible with 3D CMOS image sensors. Since, due to the expected legal pressure, there is or will be a high demand for such intelligent systems on part of the automotive industry, a significant market potential results for this field of application.

The advantageous usage of active lighting in three-dimensional (3D) CMOS cameras for capturing a three-dimensional distance image that can be used, for example, in the automotive field is described in patents DE 19833207 A1, EP 104366 B1 and WO2007/031102 A1.

Existing 3D CMOS image sensors for distance or depth measurement are largely based on the functional principle of an active image point sensor or an active pixel sensor (APS). Here, the temporal opening of an exposure window of the pixel is synchronized with the pulsed release of active scene lighting. With the desired pulse light for active scene lighting, however, a portion of the unwanted background light is also detected. Additionally, the reflectivity of the objects of the scene also influences the portion of the reflected light. Depending on the distance of the object, these factors corrupt the payload signal, partly to a considerable extent. In order to obtain sufficiently exact distance information, several images are captured with the laser (pulse light) turned on or off, as well as with two different effective exposure or shutter times. This approach has several disadvantages. On the one hand, capturing the series image sequences (serial capturing) limits the bandwidth, which is why 3D applications are not possible in high and highest speed applications. Further, by serial reflectance correction, it is necessitated to pulse the laser source twice, which means unnecessary energy doubling, which can collide with requirements regarding eye safety with respect to laser radiation in certain fields of application, such as automobile exterior surveillance.

SUMMARY

According to an embodiment, an optical distance measuring device may have: a pulsed radiation source implemented to transmit, in a temporally contiguous radiation pulse period, a radiation pulse having a pulse duration that is shorter than the radiation pulse period, and to transmit no radiation pulse in a temporally contiguous dark period; a detection means for detecting different amounts of radiation in two overlapping detection periods during the radiation pulse period to capture reflections of the radiation pulse at the object surface and a background radiation and/or in two overlapping detection periods during the dark period to capture a background radiation; and an evaluation means determining a signal depending on a distance of the optical distance measuring device to an object, based on the detected amounts of radiation.

According to another embodiment, an apparatus may have: a capacitive pixel sensor element subjected to a charge or discharge process in dependence on a measured quantity that can be detected at a pixel sensor element output; at least one buffer amplifier; first and second sample capacitances; first and second switches, via which the first or the second sample capacitance can be connected to the pixel sensor element output via the at least one buffer amplifier; a controller that is implemented to control the first and second switches such that the first switch is closed in a first time window and the second switch is closed in a second time window, wherein the first time window and the second time window temporally overlap such that, at the end of the first and second time windows, different voltage signals describing the charge or discharge process of the capacitive pixel sensor element are applied to the first and second sample capacitances.

Another embodiment may have a double sampling system having a plurality of inventive apparatuses, wherein the apparatuses are arranged in arrays, wherein an evaluation means that can be coupled, with the help of a controller for controlling the arrays or the individual apparatuses via a select switch and a read line, to the voltage signals of the sample capacitances describing the charge or discharge process of the capacitive pixel sensor element is associated with every array or every single apparatus.

According to another embodiment, a method for optical distance measurement may have the steps of: emitting a radiation pulse with a pulsed radiation source implemented to transmit, in a temporally contiguous radiation pulse period, a radiation pulse having a pulse duration $t_p$ that is shorter than the radiation pulse period, and to transmit no radiation pulse in a temporally contiguous dark period; detecting different amounts of radiation with a detection means that is implemented to capture reflections of the radiation pulse at an object surface and background radiation in two overlapping detection periods during the radiation pulse period and/or to capture background radiation in two overlapping detection periods during the dark period; and determining a signal depending on the distance to be measured based on the detected amounts of radiation.

According to another embodiment, a multiple sampling method may have the steps of: electrically coupling a first sample capacitance to an output of a capacitive pixel sensor element via a buffer amplifier during a first time window having a first duration, and electrically coupling a second sample capacitance to the output of the capacitive pixel sensor element via a buffer amplifier during a second time window having a second duration, wherein the first and the second time window temporally overlap, such that at the end of the first and second time windows different voltage signals describing a charge or discharge process of the capacitive pixel sensor element are applied to the first and second sample capacitances.

Another embodiment may have a computer program having a program code for performing the inventive method, wherein the program code is performed on a computer, a microcontroller or a digital signal processor.

The object solved by the invention consists of the generation of an optical distance measuring device or an apparatus and a method for optical distance measurement, which can detect both the extraneous background light components, and the reflectance components in a single measurement cycle. This means pulsing the radiation or laser source twice per 3D picture can be avoided. The problem of eye safety with regard to laser energy is significantly reduced, since only half of the originally used laser energy is needed. Further, by omitting a second pulse sequence, maintaining a waiting time for recovery of the laser of typically several microseconds is simplified, since the whole measurement cycle per 3D picture or 3D distance measurement can be reduced to merely one laser pulse sequence. Advantageously, compared to series image capturing, this reduces the measurement time by half in the first approximation.

An optical distance measuring device according to the present invention comprises a pulsed radiation source implemented to transmit, in a temporally contiguous radiation pulse period, a radiation pulse having a pulse duration tp that is shorter than the radiation pulse period, or to be activated, and to transmit no radiation pulse or to be deactivated in a temporally contiguous dark period. Further, the optical distance measuring device according to the present invention comprises a detection means for detecting different amounts of radiation in two overlapping detection periods, during the radiation pulse period to capture reflections of the radiation pulse at an object surface and background radiation, and/or during the dark period to capture background radiation. Additionally, the optical distance measuring device comprises an evaluation means determining, based on the detected amounts of radiation, a signal depending on a distance of the optical distance measuring device to an object.

Further, the present invention provides a method for optical distance measuring by emitting a radiation pulse with a pulsed radiation source implemented to transmit, in a temporally contiguous radiation pulse period, a radiation pulse having a pulse duration tp that is shorter than the radiation pulse period, and to transmit no radiation pulse in a temporally contiguous dark period. Further, the method comprises detecting different amounts of radiation with a detection means implemented to capture reflections of the radiation pulse at an object surface and background radiation, in two overlapping detection periods during the radiation pulse period, and/or to capture a background radiation during the dark period, and further determining signals depending on the distance to be measured based on the detected amounts of radiation.

Embodiments of the present invention provide the advantage that a detection means for detecting different amounts of radiation in two overlapping detection periods is implemented in parallel, so that the information on distance, reflectance as well as background portions contained in a reflected radiation pulse can be captured in a single radiation pulse period, and a background signal portion without a reflected radiation pulse can be detected in a second dark period. Then, in an evaluation means implemented in parallel in one embodiment, a signal depending on a distance of the optical distance measuring device to an object can be determined based on the detected radiation energies.

Hence, the inventive optical distance measuring device or the inventive method for optical distance measurement can provide the possibility of disproportionately increasing the measuring speed and to reduce radiation energy necessitated for measuring by half.

BRIEF DESCRIPTION OF THE DRAWINGS

Embodiments of the present invention will be detailed subsequently referring to the appended drawings, in which:

FIG. 3b is an illustration of the connection between pixel reset and shutter signal of FIG. 3a;

DETAILED DESCRIPTION OF THE INVENTION

Figure 1:
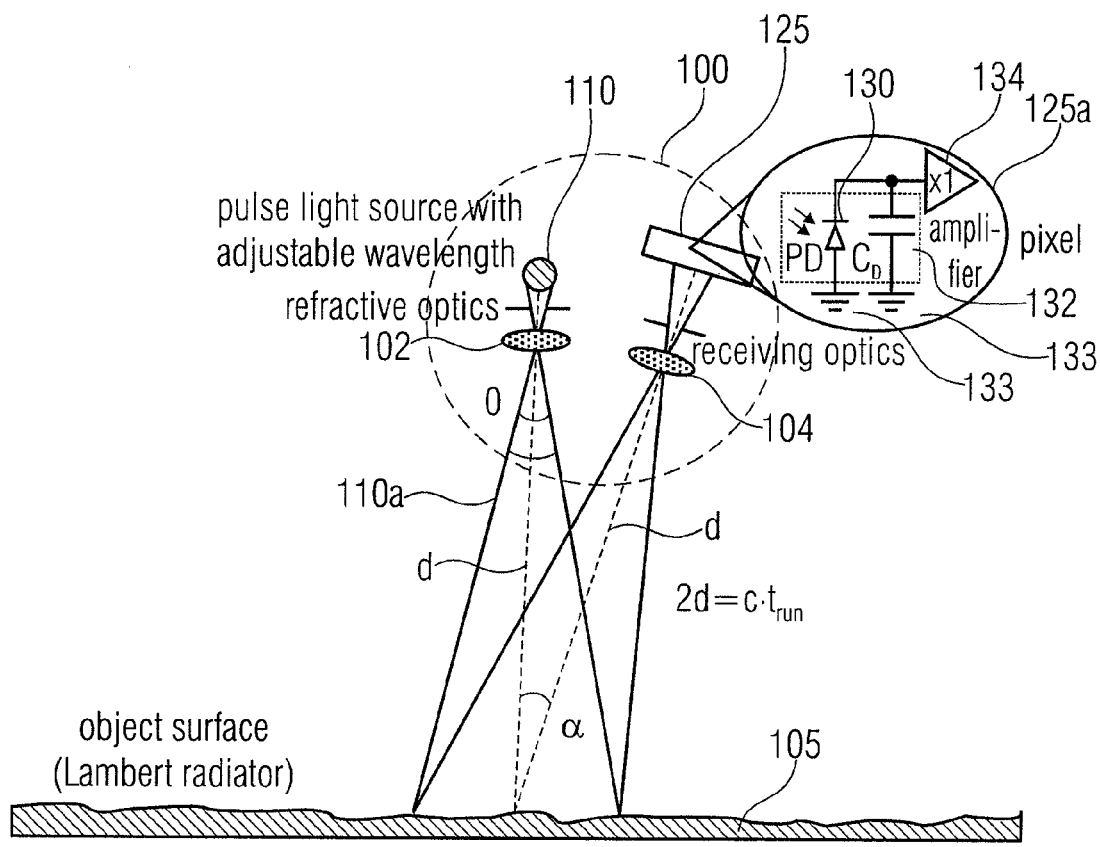
FIG. 1 is a schematical illustration of the measuring arrangement for depth or distance detection.

Regarding the following description of the embodiments of the present invention, it should be noted that, in order to simplify matters, the same reference numerals are used in the entire description in the different figures for functionally identical or equally acting, or functionally equal, equivalent elements.

FIG. 1 illustrates a schematical arrangement of a measurement system 100 for optical distance measurement and a possible pixel architecture 125a of an image sensor. For obtaining distance or depth information, a target object 105 is irradiated with a pulsed laser 100. In a phase-locked manner thereto, the exposure of an integrating photoreceiver array in the image sensor 125 begins. The distance d of the sensor to the irradiated object 105 is decisive for the runtime of the light pulse 110a emitted by the laser source 110 and hence for the optical power measured by the receiver 125 in a fixed exposure time window. The optical distance measuring device 100 can, for example, have refractive optics 102 and receiving optics 104, mapping the laser pulse to the target object or the reflected beam to the receiver 125. After the refractive optics 102, the laser pulse can have an opening angle θ. The pulse light source or laser light source 110 can have a negligibly small angle α with regard to the receiver 125, which is why the whole distance traveled by the emitted and reflected light pulse is 2d. With a known fixed angle α and a known distance d, this local difference can also be compensated in a computational manner. The laser pulse is reflected at the irradiated surface 105, wherein the object surface can be a Lambert radiator, and then impinges onto the photosensitive surface of the receiver unit 125 after a runtime delay $t_{run}=2d/c_{light}$ with the residual energy $E_{laser}$. The receiver unit can, for example, be a CMOS image sensor. The laser pulse from the pulse light source 110 and the exposure measurement in the receiver start in an adjustable phase-locked or time-locked manner, i.e. in this embodiment, for example, simultaneously at a time $t=T_{1,0}$ (see FIG. 3a). Thus, depending on the size of the distance d, the runtime until the reflected pulse is detected in the receiver 125 will be shorter or longer, and the period 303 shifts along a time axis t in FIG. 3a to the left or to the right. With increasing distance, the delay time increases and the period $t_{run}$ shifts to the right. In the receiver 125, the measurement is taken in an integrative manner in a short time interval $t_p$ or in a longer time interval $t_s$, the so-called shutter time. In this arrangement, the signal measured by the photoreceiver 125 is linearly proportional to the distance. As illustrated schematically in FIG. 1, the photoreceiver 125 can consist of a series of pixels 125a. The pixel 125a can, for example, be a PN photodiode 130. The PN photodiode 130 can generate a photocurrent or a photo charge by lighting.

The pixel 125a can, for example, be an N well/P substrate photodiode with a parallel barrier layer capacitance $C_D$ 132, which can be connected to ground 133 with one terminal, and connected to a buffer amplifier 134, which can be implemented as a voltage follower (source follower), with a further terminal.

Thus, the receiver 125 can, for example, be a sensor made up of active pixel elements (active pixel sensor (APS)), which is, for example, produced in CMOS technology and is frequently referred to as a CMOS sensor. By using CMOS technology, it is possible to integrate further functions, such as free selection of the sensor area to be read out, exposure control, contrast correction or analog/digital conversion.

It is also possible that the pixel 125a is a passive pixel, where the pixel has no amplifier 134 amplifying or rendering the signal created by the photodiode. Exemplarily, two principles for pixel readout are mentioned here. In a first principle of charge readout, a charge accumulated on a barrier layer capacitance 133, which is generated due to the internal photo effect during the interaction of a radiation with the photodiode, is read out. In another pixel principle, the pixel has a buffer amplifier in the form of a voltage follower 134. In pixels operating according to this principle, a voltage applied across the pixel is read out. Thereby, t voltage is thereby reduced by the charges of the electrons and holes generated because of the inner photo effect.

In the following, the mode of operation of a receiver 125 will be illustrated exemplarily based on a circuit (FIG. 2) for a pixel 125a of the image sensor 125 and an associated time diagram (FIG. 3a) illustrating the measurement regulation for distance measurement with extraneous light correction.

Figure 2:
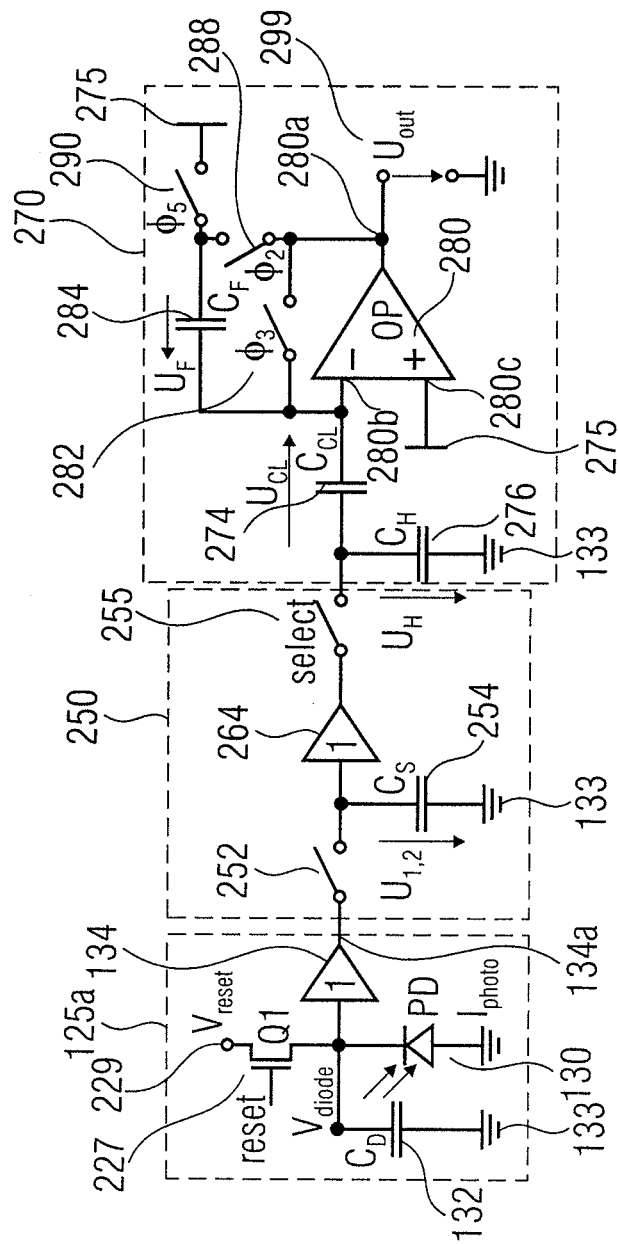
FIG. 2 is the circuit diagram of an analog readout path for a 3D camera.

FIG. 2 shows the schematical structure of a standard 3D runtime analog readout path for a pixel 125a. The pixel 125a in FIG. 2 comprises, for example, an N well/P substrate photodiode PD 130 with the barrier layer capacitance $C_D$ 132 as a detection unit. At the beginning of every exposure process, the photodiode PD 130 is biased with a reset potential $V_{reset}$ 229 via a reset switch 227 that can be implemented as transistor Q1. Additionally, the pixel 125a has a buffer amplifier 134, for example a so-called source follower or voltage follower. Normally, the buffer amplifier 134 is implemented as a source follower and buffers the voltage applied across the capacitance $C_D$ 132. The output of the source follower 134 can be connected to a sample and hold circuit 250 via a switch or shutter 252 with a sample capacitance $C_S$ 254 and a further buffer amplifier 264 of the sample and hold circuit 250. The output of the buffer amplifier 264 can be connected to a subsequent circuit for (correlated) double sampling—(c)DS circuit 270 via a select transistor 255.

At the beginning of an exposure process, the photodiode 130 and hence the barrier layer capacitance $C_D$ 132 and the sample capacitance $C_S$ 254 is charged to the defined start potential $U_{ref}$ 220 after closing the reset transistor $Q_1$ 227 and the switch 252. When subsequently the reset switch 227 is opened and hence the photodiode 130 with the barrier layer capacitance 132 is decoupled from the voltage $U_{ref}$ 229, the electron hole pairs resulting from the radiation impinging on the photodiode discharge the capacitances $C_D$ 132 and $C_S$ for so long until the shutter 252 is deactivated, i.e. opened. A voltage reproducing the temporal discharge process by the impinging radiation is hence transmitted to the capacitance $C_S$ 254 via the buffer amplifier 134. After an integration time $\tau_{int}$, this process is interrupted. This means after opening the switch 252, the sample capacitance 254 of the sample and hold circuit 250 has a residual voltage $U_1$ describing the discharge process of the barrier layer capacitance of the photodiode due to the incident radiation in a period. Spatial distance detection or distance measurement becomes possible by arranging the pixels in a matrix (array) and by means of synchronous exposure of all receiving elements (pixels) and the shutter signal at the photodiode. Opening the shutter, i.e. terminating the integration, interrupts the current flow to the sample capacitance $C_S$ 254, so that the current value of the light-proportional elementary charges accumulated onto the capacitances $C_D$ 232 and $C_S$ 254 is "frozen". If the reflected laser pulse and the integration time overlap partly during the shutter signal, the voltage $U_1$ applied to $C_S$ 254 will include information on the distance d and on extraneous light portions. If the duration of the shutter signal and hence the integration time is larger than the pulse width $t_p$ of the laser, the voltage $U_2$ applied to the sample capacitance 254 is a measure for the completely accumulated laser power density, further having information on extraneous light portions, reflectance portions r and sensitivity R of the used photodiode. This circumstance is used for compensating extraneous light or background light portions. The measurement result obtained by integration in a time window partly overlapping with the reflected laser pulse includes, in addition to the distance d and the extraneous light portions, information on the reflectance r of the exposed object, the sensitivity R of the used photodiode which are created by inevitable influences of environmental lighting.

For obtaining the pure distance value, i.e. for distance measurement, in the conventional method, two measurement cycles are performed one after the other, which differ in the integration time or the duration of the shutter signal, i.e. the time in which the shutter or the switch 252 is closed and the discharge process of the barrier layer capacitance 232 and the sample capacitance 254 is performed by light incident on the photodiode. A first integration window with a first integration time corresponding to the shutter signal can therefore correspond to the duration and the pulse width $t_p$ of the laser pulse used for distance measurement, and a second integration time $t_s$ or $t_{int2}$ of a second integration window can be larger than the pulse width $t_p$ of the laser pulse.

Figure 3A:
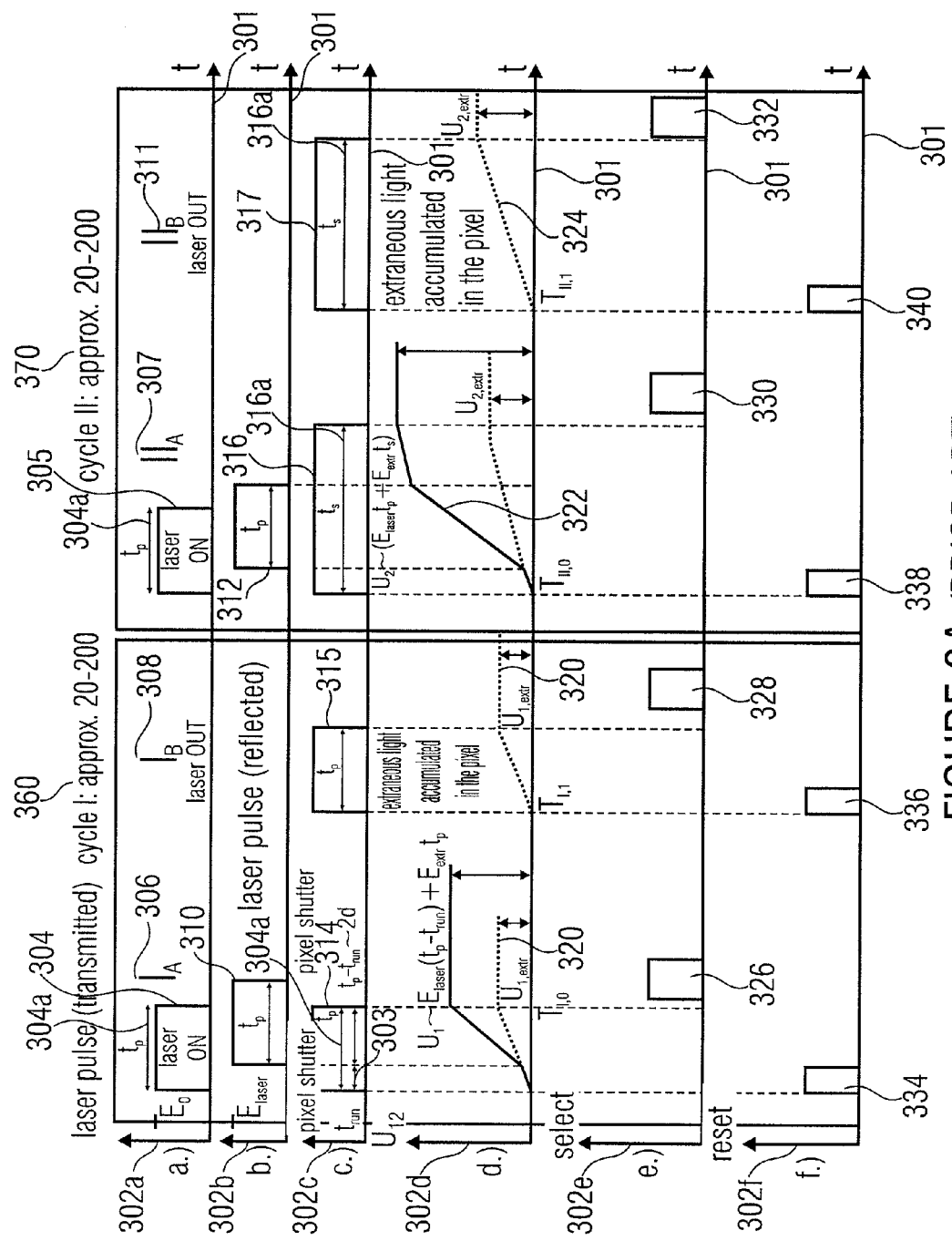
FIG. 3a is the time scheme for distance measurement with extraneous light correction for a circuit according to FIG. 2.

The time scheme or measurement regulation for distance measurement with the circuit illustrated in FIG. 2 is illustrated schematically in the time diagrams of FIG. 3a. The x axis 301 of diagrams a-f in FIG. 3a represents time axes t, on which the timeline of the interaction of individual components of the circuit for distance measurement with extraneous light correction is illustrated. Both the time axes t 301 and the respective y axes 302a-302f are illustrated in arbitrary units and serve merely for illustrating the time events. On the y axis in FIG. 3a, the following is illustrated: in diagram a the laser pulse, in diagram b the reflected laser pulse, in diagram c the switching behavior of the pixel shutter, in diagram d the voltage at the sample capacitance, in diagram e the select signal and in diagram f the reset signal.

As illustrated in FIG. 3a, in a first cycle I 360 comprising two sub-cycles $I_A$ 306 and $I_B$ 308 and that can last, for example, 20-2000 nanoseconds, a photodiode is biased in a defined manner in response to a reset signal 334 (diagram f), as described above, i.e. a biased barrier layer capacitance is build up. When resetting the pixel by the switch 227 (FIG. 2), the switch 252, i.e. the shutter, can be closed simultaneously. The integration time starts when the reset is on "0", i.e. the reset switch 227 is opened again, and stops when the shutter signal is subsequently on "0", i.e. the switch 252 is opened again.

Figure 3B:
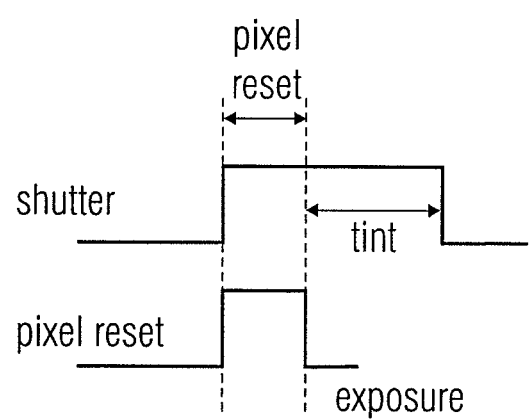

FIG. 3b shows this temporal connection between the shutter signal illustrated in diagram c in FIG. 3a and the pixel residual signal as illustrated in diagram f in more detail. During the pixel reset 334, 336, 338 and 340, the pixel shutter 314, 312, 316 and 317 should be closed, as is illustrated in FIG. 3a. This means that the pixel reset and the shutter signal start simultaneously and in an overlapping manner. However, the integration time $t_{int}$ starts only after the pixel reset is terminated, i.e. is again set to "0". The integration stops when the shutter or the switch 252 is opened, i.e. the shutter signal returns to "0".

During the reset or after the reset, a laser pulse 304 (diagram a, FIG. 3a) having a pulse duration $t_p$ 304a is emitted from a laser source. Simultaneously with the reset of the pixel, the pixel shutter 252, as described in FIG. 2, is closed for a duration 314 corresponding at least to the duration of the laser pulse 304. This is illustrated in diagram c. During the first time window 314, depending on the detected extraneous light portion and the detected reflected laser pulse, the sample capacitance 254 is discharged and hence the voltage $U_1$ across the sample capacitance 254 is reduced, as is illustrated in diagram d. The laser pulse 304 reflected by an object (FIG. 3a, diagram b) with its pulse width 304a necessitates a certain runtime to the object and back from the object to the sensor. It follows that the reflected laser pulse 312 is shifted to the right by the runtime $t_{run}$ 303 on the time axis 301 in relation to the pulse window 304. As is illustrated in diagrams c and d, the pixel detects only extraneous light portions during the runtime $t_{run}$ 303 of the laser pulse, which results in a voltage signal $U_{1,extraneous}$ 320 at the sample capacitance 254. In a second time range $t_p$-$t_{run}$ of the integration window 314, a superposed voltage $U_1$ results, which includes both the extraneous light portion and the laser light portion reflected by the object. The second time portion of the integration window 314 (with $t_{int} \geq t_p$) corresponds to the overlapping period of the reflected laser pulse 312 with the first integration window of the pixel shutter 314. This means, for this example, this corresponds to a duration $t_p$-$t_{run}$, which includes, apart from the extraneous light or background light portions, the reflectance and the sensitivity, also the distance information to the object. As shown in diagram d, the following applies for the voltage $U_1$: $U_1 \sim E_{laser}(t_p - t_{run}) + E_{extraneous} t_p$. By closing 326 the select switch 255 (see FIG. 2), the voltage signal $U_1$ is passed on to the circuit for (correlated) double sampling 270) this circuit for (correlated) double sampling and its mode of operation will be discussed in more detail below.

By a further reset pulse 336, as is illustrated in diagram f, a first sub-cycle $I_A$ 306 is terminated during the first cycle 360 and the second sub-cycle $I_B$ 308 where no laser pulse is emitted begins. In this second sub-cycle $I_B$ 308, integration is performed for a duration $t_{int} \geq t_p$, which corresponds at least to the pulse period 304. For this purpose, the pixel switch is closed again, and an extraneous light portion 320 without reflection portions is integrated by the laser pulse or charges are accumulated in a time window 315 having the duration $t_{int} \geq t_p$. This means that, at the end of the integration time, the pixel switch 252 is opened so that a voltage $U_{1,extraneous}$ 320 corresponding to the background or extraneous light portion is applied to the sample capacitance 254 (FIG. 2). The voltage applied to the sample capacitance 254 can then be passed on to the circuit for (correlated) double sampling 270 by closing the select switch 255. By this, the first cycle I 360 consisting of the first sub-cycle $I_A$ 306 and the second sub-cycle $I_B$ 308 is terminated. In order to be able to perform correct correction with regard to reflectance and distance-induced attenuation of the laser pulse for the distance measurement, a second cycle II 370 follows, which is also divided into two sub-cycles $II_A$ 307 and $II_B$ 311. The second cycle II 370 can, for example, again comprise a period of 20 to 2000 nanoseconds. Analog to the description of the first cycle I 360, in response to a reset signal the pixel with the sample capacitance 254 is biased to a defined reference voltage. For example, as is illustrated in FIG. 3a, a second laser pulse 305 with the laser pulse period 304a $t_p$ can be emitted simultaneously to the second time window 316 for integrating the photodiode signal. The second time window 316 has a duration $t_s$ or $t_{int2}$ 316a, which is larger than the pulse width or duration 304a ($t_p$) of the laser pulse 304. As is illustrated in diagram b in FIG. 3, analog to the first cycle 360, the reflected laser pulse 312 will impinge on the pixel sensor with its pulse width $t_p$ offset by the runtime $t_{run}$. As is illustrated in diagram c in FIG. 3, in the second cycle II 370, the second integration time window 316 has a duration $t_s$ 316a that is longer than the duration $t_p$ of the laser pulse. For this reason, the photodiode signal is integrated for the whole laser pulse $t_p$ and the respective extraneous light portion. This is illustrated in the voltage curve 322 in diagram d. A voltage $U_2$ is applied to the sample capacitance 254, for which the following applies: $U_2 \sim (E_{laser} \, t_p + E_{extraneous} \, t_s)$. It follows that the voltage $U_2$ includes both extraneous light portions and the completely integrated reflected laser pulse power. The voltage $U_2$ applied to the sample capacitance 254 after opening the shutter or closing the time window 316 can then again be passed on to the circuit for (correlated) double sampling 270 by closing 330 the select switch 254. Thereby, the first sub-cycle $II_A$ 307 of the second cycle II 370 is terminated. By resetting 340 the photodiode by closing a reset switch 227 (FIG. 2), the pixel and therewith the barrier layer capacitance can be reset to a predefined starting value. The reset 340 of the pixel with the switch 227 can again be performed simultaneously with closing the shutter switch 252. The integration time of the time window 316 starts again when the reset is on "0", i.e. the reset switch 227 is opened and stops when the shutter signal is on "0" after wards, i.e. the switch 252 is opened again. In the second sub-cycle $II_B$ 311 of the second cycle II, also no laser pulse is emitted. But, again, integration is performed during a second period 317 having a duration $t_s$ 316a, which is given by opening the reset switch 227 and the period where the shutter switch 252 is closed. Thereby, the background light or the extraneous light portion at the signal $U_2$ is integrated in a time window identical to the first sub-cycle 308, but without reflected laser pulse. This means the voltage $U_{2,extraneous}$ 324 applied to the sample capacitance 254 includes or corresponds to only the extraneous light portion of the accumulated charge or voltage at the capacitance. After opening the pixel shutter 252 or closing the time window 317, then, for example again by controlling 332 the select switch 255 (FIG. 2), the voltage signal $U_{2,extraneous}$ 324 can be transferred to the circuit for (correlated) double sampling 270. A continuous transfer of the voltage signal during the integration time $t_{int}$ to the circuit for (correlated) double sampling is also possible.

As is shown in FIG. 2, the circuit for (correlated) double sampling (CDS) comprises an operational amplifier 280, wherein the output 280a of the operational amplifier can be connected to the "non-inverting" input 280b of the operational amplifier 280 via a reset switch 282. The "inverting" input 280c of the operational amplifier 280 can be on an offset potential 275. The correlated double sampling circuit 270 can be connected to the sampling capacitance $C_S$ 254, which can be connected to ground 133 on one terminal side, and the buffer amplifier 264 via the select switch 255. The buffer amplifier 264 can have, for example, an amplification of 1.

Further, the circuit for (correlated) double sampling 270 has a sample capacitance $C_{C1}$ 274 and a hold capacitance $C_H$ 276, which is connected to ground 133 on one terminal side. The sample capacitance $C_{C1}$ 274 is connected on one side with $C_H$ and on its other terminal side with the "non-inverting" input 280b of the operational amplifier and with a feedback capacitor $C_F$ 284. The feedback capacitor 284 can be connected either with the output 280a of the operational amplifier via a feedback switch $\Phi_2$ 288 or with a reference potential 275 via a reference potential switch $\Phi_5$ 290. An output voltage of the correlated double sample circuit 270 can then be applied to the output 299.

The functional principle of the circuit for (correlated) double sampling 270 is based on the fact that a voltage difference, which is applied to the output 299, can be formed between two voltage values, namely a first voltage value V1 and a second voltage value V2. The first voltage value V1 can be, for example, the reset voltage value 275, and the second voltage value V2 can be, for example, a signal voltage value. The first voltage value V1 and the second voltage value V2 are sampled at two subsequent times shifted by one clock phase. Thereby, a voltage value is at first temporarily stored on the sample capacitance 254, 274, so that in a second clock phase, a differential signal or a differential voltage can form between the two voltage signals at the feedback capacitance 284, which is on the reset voltage value 275. Thereby, a possibly existing offset and a low-frequency noise that can occur due to the amplifier 280 or the preceding buffer amplifier or sample and hold circuit 250 or the pixel element 125a, and which can have an effect on both voltage values (the first voltage value V1 and the second voltage value V2), is suppressed. Additionally, the correlated double sample circuit 270 allows a low-frequency noise suppression compared to the CDS frequency.

In the following, the mode of operation of the correlated double sample circuit 270 will be discussed in more detail. In a first phase, where the switch 282 $\Phi_3$ is closed, the input 280b and the output 280a of the operational amplifier 280 are short-circuited via switch 282. The switch $\Phi_5$ 290 is open and only closed prior to the integration phases 306, 308, 307 and 311 (FIG. 3a) or prior to all multiple exposures for biasing once to a reference voltage 275. The switch $\Phi_2$ 288 is open, i.e. non-conductive. During this phase, the feedback capacitor 284 is charged up to an offset voltage of the operational amplifier 280. The sample capacitance 274 and the hold capacitance 276 are charged up to a differential voltage applied to the CDS circuit 270 after closing the select transistor 255 and corresponds to the reference voltage 275 minus the operational amplifier offset voltage. This first time phase corresponds to the first sub-cycle 306 in FIG. 3a. During a second phase, the switch 288 $\Phi_2$ is closed and the switch $\Phi_3$ 282 is opened. Thereby, the operational amplifier 280 is switched to its feedback amplification. After the second sub-cycle 308, the voltage 320 $U_{1,extraneous}$ is applied to the input of the correlated double sample circuit 270, and the difference of voltages $U_{1,laser,extraneous} - U_{1,extraneous}$ plus a reference voltage 275 is applied to the output 280a of the operational amplifier. Analogously, in subsequent clocks, the differential voltage $U_{2,diff} = U_{2,laser,extraneous} - U_{2,extraneous}$ plus the reference voltage 275 is provided at the output 299 of the correlated double sample circuit 270.

For obtaining the pure distance value, in previous methods, two measurement cycles 360, 370 are performed one after the other, which differ, for example, in the duration of a shutter signal $t_{int}$, i.e. for example $t_p$ or $t_s$, in a first measurement cycle, the shutter duration or the time window for the integration is larger or equal to the duration of the laser pulse and at the same time partly overlapping with the reflected laser pulse. Thereby, apart from the background light portion or the extraneous light portion, the leakage current portion of the photodiode and the reflectance, the distance information included in the voltage $U_1$ is also detected. Every cycle is divided again into a sub-cycle $I_a$ 306 and $I_b$ 308. In the first sub-cycle 306, the laser source is switched on, so that the voltage $U_{1,laser,extraneous}$ applied to the output of the pixel can be described by the following equation 1:

$$U_{1,laser,extraneous} = R \cdot r [E_{laser} \cdot (t_{int} - t_{run}) + E_{extraneous} \cdot t_{int}] \quad (1)$$

In equation 1, R corresponds to the sensitivity of the photodiode, r to the reflectance of the exposed object, $E_{laser}$ to the power/radiation strength of the laser pulse, $E_{extraneous}$ to the extraneous optical power/radiation strength and $t_{int}$ to the integration time $t_{int}$, which corresponds, in this example, to the laser pulse duration $t_p$ and $t_{run}$ to the runtime of the laser pulse. Generally, $t_{int} \geq t_p$ applies.

Equation 1 includes a runtime-dependent portion and a portion depending on extraneous light. In the sub-cycle 308, the measurement is repeated, but without laser light pulse. The following applies:

$$U_{1,extraneous} = R \cdot r \cdot E_{extraneous} \cdot t_{int} \quad (2)$$

In equation 2, $U_{1,extraneous}$ includes merely the extraneous light or background light portion.

In CMOS technology, it is possible to subtract analog signals directly on the image sensor chip with very high accuracy, and this is normally performed in a so-called circuit for correlated double sampling (CDS stage), as described above. Subtraction of the two voltages with the help of the CDS stage as described above provides:

$$U_{1,diff} = U_{1,laser,extraneous} - U_{1,extraneous} = R \cdot r \cdot E_{laser}(t_{int} - t_{run}) \quad (3)$$

Since the measurements in the sub-cycles 306 and 308 are very close to each other in time, the extraneous light portions are correlated at almost 100%, which is why equation 3 is valid in the illustrated form. However, equation 3 also includes the reflectance r, which can vary significantly from pixel to pixel—in the extreme case up to a factor 1:40 for the reflection—and the sensitivity R of the photodiode, which can also vary from pixel to pixel for fabrication reasons. These parameters can now be compensated in the second measurement cycle 370. Beforehand, however, the differential value $U_{1,diff}$ is stored in the camera system, since the pixel and the CDS circuit are reset for the next measurement cycle. The following second measurement cycle II 370 is identical to the measurement cycle I 360 except for the length of the shutter signal. The second shutter time window 316 has now a significantly longer duration $t_s$ 316a than the duration of the laser pulse $t_p$, so that the whole pulse form of the reflected laser pulse in the pixel is integrated during the second time window. For that reason, no information on the distance d to the object to be measured is contained in the voltage signal $U_2$. This information is obtained by "cutting off" the received laser pulse, as was described in connection with the first cycle. For the sub-measurement cycle $II_A$ 308 of the second cycle 370, the following equation applies:

$$U_{2,laser,extraneous} = R \cdot r(E_{laser} \cdot t_{int} + E_{extraneous} \cdot t_2) \quad (4)$$

As in the cycle $I_A$ 306, a laser and an extraneous light or background portion is captured. The second sub-cycle $II_B$ 311 again provides the necessitated extraneous light portion $U_{2,extraneous}$ for compensation:

$$U_{2,extraneous} = R \cdot r \cdot E_{extraneous} \cdot t_s \quad (5)$$

In a subsequent voltage subtraction that is performed analogously, as was described in connection with the first cycle, in the correlated double sample circuit (CDS stage) 270, the following equation results for the voltage $U_{2,diff}$:

$$U_{2,diff} = R \cdot r \cdot E_{laser} \cdot t_{int} \quad (6)$$

In the camera system (not shown in the figures) the quotient from equation 3 and equation 6 can be calculated. The following applies:

$$\frac{U_{1,diff}}{U_{2,diff}} = \frac{(t_{int} - t_{run})}{t_{int}} \quad (7)$$

With the connection for the runtime $t_{run} = 2d/c_{light}$ and the assumption that the laser pulse source as well as the CMOS image sensor, the distance or the spatial position of the laser pulse source and the image sensor are known and can be compensated in a computational manner, the following applies for the distance $d_{x,y}$ of a pixel (x, y) in a pixel array with x by y pixels to its corresponding object point in the scene:

$$d_{x,y} = \frac{c_{light}}{2} \cdot t_{int} \left( \left(1 - \frac{U_{1,diff}}{U_{2,diff}}\right)_{x,y} \right) \quad (8)$$

In practice, the sensitivity and hence the distance resolution can be increased by executing cycles I 360 and II 370 each several times one after the other and adding up the differences $U_{1,diff}$ and $U_{2,diff}$ in the circuit for (correlated) double sampling and storing them in an analog memory on the chip. Therewith, in N repetition cycles of the cycle I, the distance resolution $\Delta d$ improves by the factor root (N). For explaining the measurement regulation, however, considering a single cycle is sufficient. Apart from the extraneous light portion and the reflectance, the measurement regulation described herein efficiently compensates dark current portions and low-frequent noise portions originating from the CMOS sensor, since the same are highly correlated with the laser pulse source due to the immediate measurement after the exposure. The great disadvantage of the conventional measurement method described here is the laser recovery time that has to be kept between cycles I and II. Further, for the standard method for distance measurement described here for explanation purposes, one laser or radiation pulse each is necessitated both in the first cycle I 360 and in the second cycle II 370. The serial reflectance correction necessitates pulsing the laser source twice, which means unnecessary laser energy doubling, which can collide with the requirements regarding eye safety in certain cases of application (automobile external surveillance).

Figure 4:
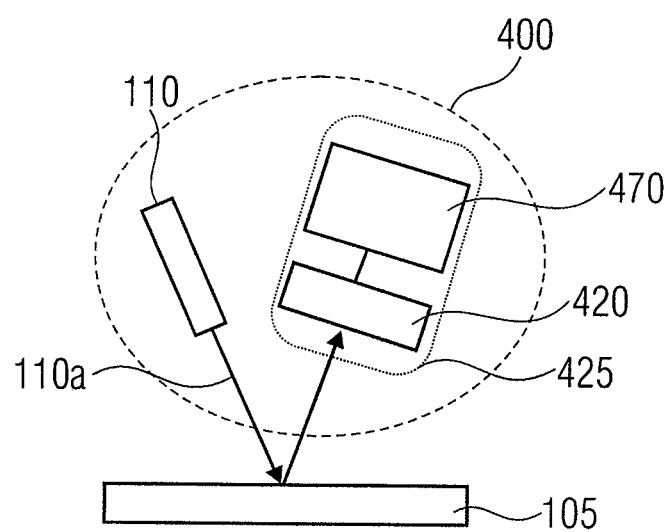
FIG. 4 is a schematical illustration of an optical distance measuring device according to an embodiment of the present invention.

An optical distance measuring device 400 according to an embodiment of the present invention is illustrated in FIG. 4. The optical distance measuring device 400 has a pulsed radiation source 110 which is implemented to transmit, in a temporally contiguous radiation pulse period, a radiation pulse having a pulse duration $t_p$ that is shorter than the radiation pulse period, and to transmit no radiation pulse in a temporally contiguous dark period. Further, the optical distance measuring device 400 has a detection means 420 for detecting different amounts of radiation in two overlapping detection periods, during the radiation pulse period to capture reflections of the radiation pulse at an object surface and a background radiation and/or in two overlapping periods, during the dark period, to capture background radiation. Further, the optical distance measuring device 400 has an evaluation means 470, which determines a signal depending on a distance of the optical distance measuring device to an object 105 based on the detected amount of radiation. A receiver 425 can comprise one or several detection means 420 and evaluation means 470.

The pulsed radiation source can, for example, be a pulsed laser emitting a radiation pulse in the ultraviolet (UV), visible or infrared (IR) spectral range. The emitted radiation pulse can also be a modulated radiation pulse. In this case, an object whose distance is to be determined will be irradiated with modulated light, wherein the signal received by the pixel will be demodulated on the receiver side, such that the phase difference between the transmitted and the reflected signal provides the information on the distance to the object.

The detection means 420 can be implemented, for example, such that the two overlapping detection periods during the radiation pulse period start synchronously with the radiation pulse of the pulsed radiation source, wherein a first detection period with a duration $t_{int}$ corresponds, for example, to the pulse duration $t_p$, and a second detection period has a duration $t_{int2}$ that is longer than the radiation pulse duration $t_p$ and/or that the two overlapping detection periods during the dark period start synchronously after the termination of the radiation pulse period, wherein a third detection period corresponds, for example, to the pulse duration $t_p$ and a fourth detection period has a duration $t_{int2}$ that is longer than the pulse duration $t_p$.

In a different embodiment, the detection means 420 can be implemented such that the two overlapping detection periods for detecting the reflections of the radiation pulse define the radiation pulse period and the detection periods start phase-locked and temporally offset with the radiation pulse of the pulsed radiation source. The first detection period can be smaller, larger or equal to $t_p$ ($t_{int} \geq t_p$). The second detection period can have a duration $t_{int2}$ that is longer than the radiation pulse duration $t_p$ ($t_{int2} > t_p$). The two overlapping detection periods during the dark period can start synchronously or in a phase-locked manner, wherein a first detection period of the dark period can have a duration $t_{int3}$ and a second detection period of the dark period can have a duration $t_{int4}$. The durations of the first and second detection periods in the dark period can be different. In embodiments, the duration of the first and second detection periods of the dark period can correspond to the duration of the first and second detection periods of the radiation pulse period. The dark period can be before or after a radiation pulse period. The detection periods are also referred to as integration windows having an integration time or as a shutter or shutter signal having a respective shutter or integration time.

In embodiments, the detection means 420 can further have an optical sensor for detecting different amounts of radiation providing a signal, for example an electrical signal, based on a charge or voltage, which can then be detected in the overlapping detection periods.

In other embodiments of the present invention, the evaluation means 470 of the optical distance measuring device 400 can be implemented, for example, such that the signal to be determined by the evaluation means 470 is a differential signal. These differential signals can be generated by the evaluation means by subtraction of signals temporarily stored in the evaluation means 470. These temporarily stored signals depend on different amounts of radiation detected in two overlapping detection periods during the radiation pulse period and the dark period by the detection means 420. In other words, the evaluation means 470 is implemented such that differential signals are formed by subtraction between the two signals detected in the two respective overlapping detection periods in the radiation pulse period and the dark period, which have a defined dependency on the amount of radiation detected by the detection means.

Figure 5:
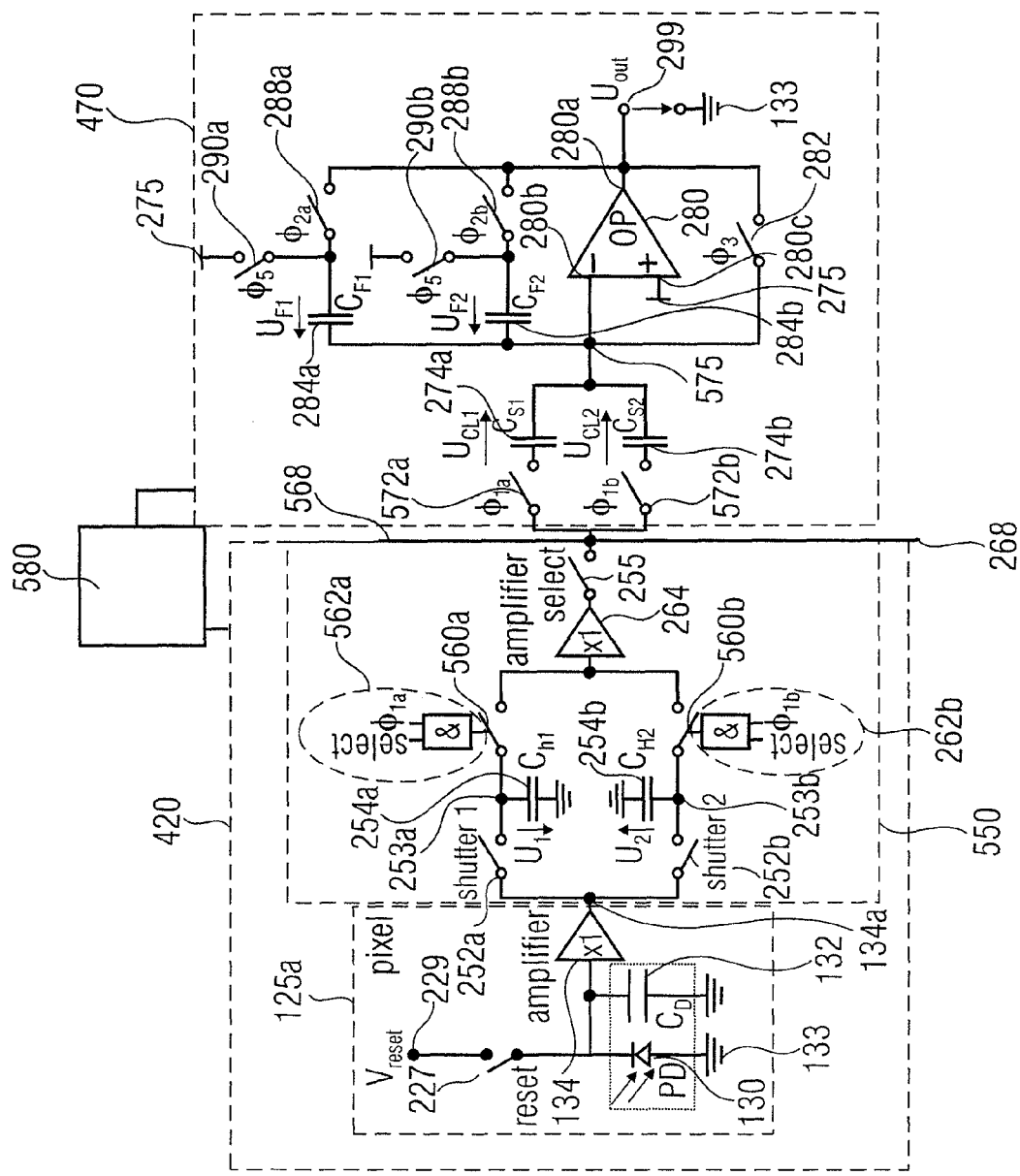
FIG. 5 is a circuit for an optical distance measuring device or an apparatus for distance measurement with double sampling according to an embodiment of the present invention.

FIG. 5 illustrates, in a further embodiment, a detection means 420 and an evaluation means 470 in the form of a circuit diagram. In one embodiment, the detection means 420 comprises a pixel element 125a as well as a sample and hold circuit 550. The pixel element 125a has a photodiode 130 and a barrier layer capacitance 132 of the photodiode arranged in parallel, wherein the anode of the photodiode and a terminal of the barrier layer capacitance 132 are connected to a ground potential 133. The photodiode and the barrier layer capacitance can be coupled to a reset voltage $V_{reset}$ 229 via a reset switch 227. As is illustrated in FIG. 5, the cathode and the second terminal of the barrier layer capacitance are connected to a buffer amplifier 134. The output of the buffer amplifier 134, which can, for example, be a voltage follower (source follower) having an amplification of 1, is connected to a sample and hold circuit 550 constructed in parallel. The sample and hold circuit 550 has one sample capacitance 254a and 254b each in two parallel branches, wherein one terminal each of the sample capacitances 254a and 254b is connected to the ground potential 133 and the respective other terminal of the sample capacitances is connected in each case to the output of the buffer amplifier 134 in every parallel branch via one switch 252a and 252b each. Further, the sample capacitances 254a and 254b are connected to a further switch 560a and 560b via a circuit node 253a or 253b and via a logical AND gate.

In the embodiment, the switches 560a and 560b can be controlled by a control logic 562a, 562b. In this embodiment, opening and closing the switches 562a and 562b depends on a select signal and the $\Phi_{1a}$ or $\Phi_{1b}$ signal. The sample and hold capacitances 254a and 254b can be connected to a further buffer amplifier 264 via switches 560a and 560b, and via the same to the select switch 255 and hence the output of the sample and hold circuit 250.

Further, FIG. 5 illustrates a read line 568, via which in embodiments of the present invention pixel or detection means 420 arranged, for example, in rows and columns can be connected to the downstream evaluation means 470 by respective control by a control logic.

The evaluation means 470 can have, for example, an operational amplifier 280, wherein an "inverting input" 280b of the operational amplifier 280 can be connected to the output 280a of the operational amplifier via a switch 282 that can be controlled with a signal $\Phi_3$. The non-inverting input 280c of the operational amplifier 280 can be on a reference potential 275. First 274a and second 274b sample capacitances of the evaluation means 470 connected in parallel are connected to the input of the evaluation means 470 via first 572a and second 572b sample switches. The first 572a and second 572b sample switches can each be opened or closed in response to a signal $\Phi_{1a}$ or $\Phi_{1b}$. The two sample capacitances 274a and 274b are connected to a node 575 at their other terminal side, which provides, on the one hand, an electrical connection to the "inverting" input 280b of the operational amplifier 280, and, on the other hand, an electrical connection to two feedback capacitances $C_{F1}$ 284a and $C_{F2}$ 284b connected in parallel. Additionally, the node 575 can be coupled to the output 280a of the operational amplifier via the switch 282. The two feedback capacitances 284a and 284b are connected to the input 280a of the operational amplifier 280 via the amplifier switches 288a and 288b. The two feedback capacitances 284a and 284b connected in parallel are additionally electrically coupled to a reference potential 275 via a reference voltage switch 290a and 290b. The reference voltage switches 290a and 290b can be closed or opened in response to a signal $\Phi_5$. The two amplifier switches 288a and 288b can be opened or closed in response to a signal $\Phi_{2a}$ or $\Phi_{2b}$. The output 280a of the operational amplifier is connected to the output 299 of the evaluation means, wherein the output 299 of the evaluation means 299 can simultaneously correspond to an output of the inventive optical distance measuring device or the inventive apparatus. At this output, the evaluation result or part of the evaluation result can be output in the form of a voltage $U_{out}$ or be passed on for further processing. This can, for example, be a differential voltage signal.

In a further embodiment of the present invention, the apparatus or the optical distance measurement device, as is indicated in FIG. 5, can comprise a control logic 580, which can be implemented such that the above-mentioned shutters and switches 227, 252a, 252b, 560a, 560b, 255, 572a, 572b, 282, 288a, 288b, 290a, 290b are controlled such that operation of the detection means and the evaluation means, as described in embodiments of this invention, is made possible.

Figure 6:
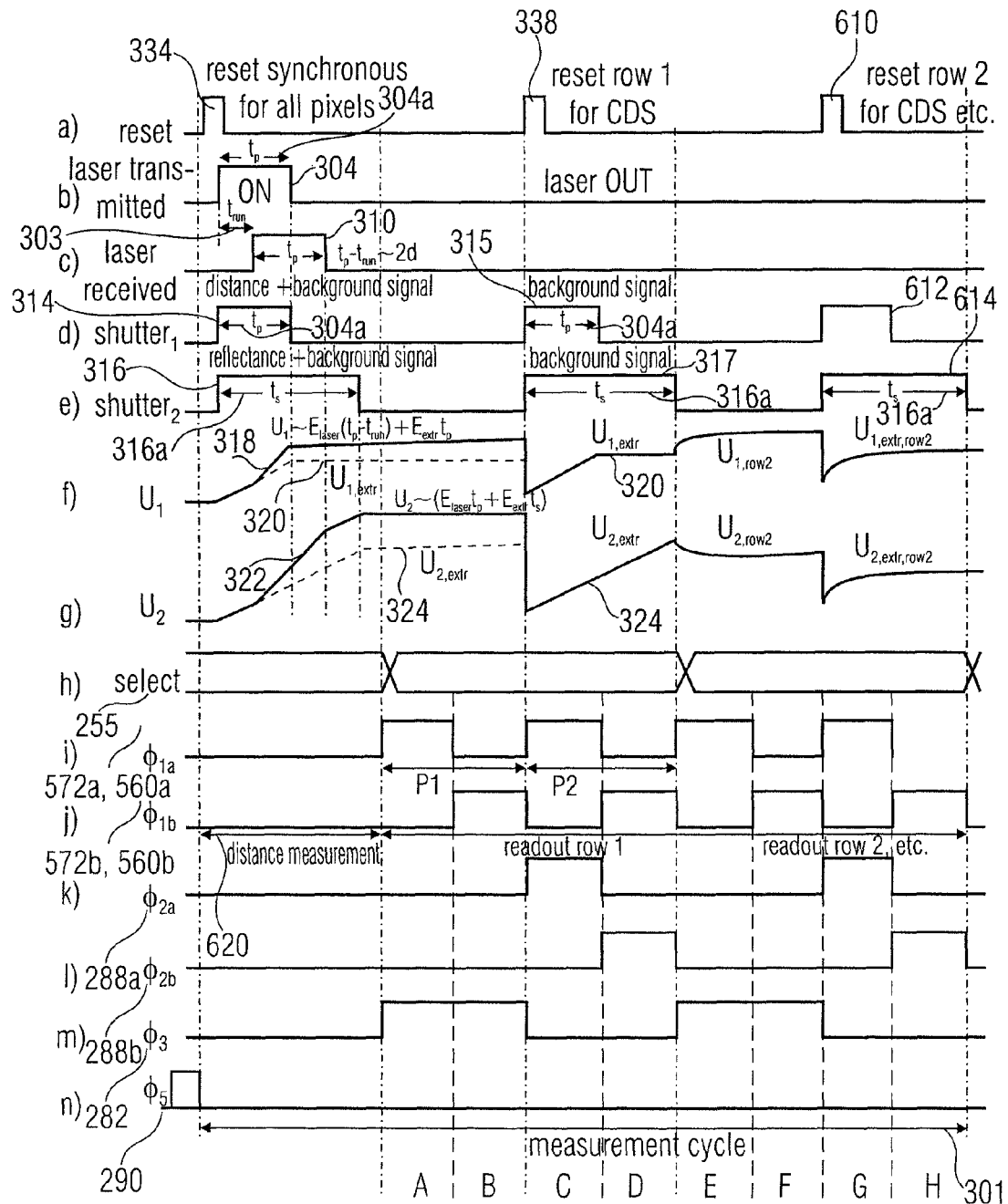
FIG. 6 is a clocking scheme for illustrating the mode of operation of the apparatus for distance measurement with double sampling according to FIG. 5.

The mode of operation of the above embodiment of FIG. 5 is illustrated in the schematic time circuit diagram in FIG. 6. In the circuit diagrams a-n in FIG. 6, the time t is plotted on the x axis in arbitrary units, and on the y axes of the diagrams a-n signal impulses, light impulses, voltages or switching states in arbitrary units. In this description of the mode of operation of the circuit of FIG. 5 it is assumed that detection means 420 or inventive apparatuses can be arranged in a matrix in rows and columns, wherein one evaluation means 470 can be associated with each column and the detection means 420 can be read out or evaluated row by row by these evaluation means 470 associated column by column. One embodiment regarding an overall arrangement will be given below in connection with FIG. 7.

In response to a reset signal 334, a defined reset voltage $V_{reset}$ 229 is applied to all pixels 125a, so that their photodiodes are set to a defined voltage. After all pixels have been reset to a predefined state, the shutter 252a and 252b (FIG. 5) is closed with temporally known coupling, e.g. simultaneously, as illustrated in this embodiment with the emission of a laser pulse 304 with a pulse duration 304a (diagram b). Closing the shutter 252a, i.e. electrically connecting the pixel element with the sample and hold circuit 550 for the first shutter 252a (FIG. 5) can be performed for a first period 304a corresponding to the pulse width $t_p$ of the laser pulse 304. The integration time $t_{int1}$ for this first time window 314 or the first detection period can hence correspond to the pulse duration $t_p$ of the emitted laser pulse 304. Generally, however, $t_{int1} \geq t_p$ applies. The second time window 316 of the second shutter 252b closed simultaneously with the first shutter 252a has a duration $t_{int2}$ 316a in this embodiment which is longer than the first detection period 314 with the duration $t_{int1}$ 304a.

As is illustrated in diagrams f and g in FIG. 6, after opening the time windows 314 or 316 and hence after electrically connecting the pixel element 125a to the sample capacitances 254a or 254b of the sample and hold circuit 550, the voltages $U_1$ 318 or $U_2$ 322 are formed at the two sample capacitances. Since the first detection period 314 can correspond to the duration of the laser pulse and is hence shorter than the second detection period 316, the sample capacitance 254a, after closing the time window 314 or opening the shutter 252a, has a voltage $U_1$ that is different from the voltage $U_2$ app lied to the second sample capacitance 254b connected in parallel after closing the second time window 316. Since the laser pulse 310 reflected at an object impinges on the pixel element 125a with the pulse duration 304a delayed by the runtime 303, the voltage $U_1$ 318 applied to the sample capacitance 254a after closing the first time window 304 contains information on the distance to the object. Additionally, the voltage $U_1$ 318 includes extraneous light or background light portions, as well as information on reflectance r and sensitivity R of the photodiode. For the voltage $U_1$, the connection shown in equation (1) applies. Since the second time window 316 has a duration $t_{int2}$ that is higher than the pulse width $t_p$, i.e., for example, higher than the pulse duration $t_p$ and the runtime 303 $t_{run}$, the second voltage $U_2$ includes information on the whole laser pulse 310 reflected on the object. Since the whole reflected laser pulse was integrated or detected, the voltage $U_2$ includes no more information on the distance to the object. The second voltage $U_2$ applied to the second sample capacitance 254b includes information on the reflectance r or the sensitivity R of the pixel. Additionally, it includes information on the background signal or an extraneous light portion 324.

In other words, by implementing the sample and hold circuit 550 and a respective control, of the overlapping different time windows 314 and 316 in parallel, the two sub-cycles $I_A$ 306 and $II_A$ 307 of FIG. 3 can be captured in parallel, i.e. with a single laser pulse.

In diagrams h-n in FIG. 6, the mode of operation of the different switches of the circuit illustrated in FIG. 5 during distance measurement will be discussed. Prior to the whole accumulation cycle, switches 290a and 290b are closed once with the help of the control signal $\Phi_5$ in order to charge the feedback capacitances 284a and 284b to a reference voltage 275. The switches 290a and 290b are opened again prior to the synchronous reset 334 for all pixels of the detection means 420. After detecting the reflected laser pulse in the two overlapping detection periods 314 and 316, the select switch 255 (FIG. 5) is closed (diagram h), which establishes a connection of the detection means 420 with the evaluation means 470. In a phase A, the control signal $\Phi_{1a}$ is logically set to "1" together with the select signal, so that the switch 560a is closed. The switch 572a in the evaluation means 470 is also closed via the control signal $\Phi_{1a}$, so that a conductive connection is formed between the first sample capacitance 254a in the sample and hold circuit 550 and the first sample capacitance 274a in the evaluation means 470. In the phase A, the switch 282 is closed by the control signal $\Phi_3$. Thereby, on the one hand, the operational amplifier 280 is short-circuited and, on the other hand, the feedback capacitances 284a and 284b are charged to an offset voltage of the operational amplifier. In this phase, the sample capacitor 274a charges to a differential voltage between the input voltage $U_1$ 318 and the reference voltage 275 of the operational amplifier 280, minus an offset voltage of the operational amplifier.

Analogously, during a second phase B, by opening switches 560a and 572a and by closing switches 560b and 572b in response to a control signal $\Phi_3$ and $\Phi_{1b}$, the second sample capacitance 274b is set to a differential voltage given by the input voltage $U_2$ 322 minus the reference voltage 275 minus the offset voltage of the operational amplifier 280. In a third phase C, the switch 282 is opened again in response to the control signal $\Phi_3$, i.e. a conductive connection is interrupted. In this phase, switches 560a and 572a are also closed by the control signal $\Phi_{1a}$, and the feedback capacitance 284 is coupled to the operational amplifier 280 by closing the switch 288a in response to a control signal $\Phi_{2a}$.

In this phase, a first row of pixels is set to a defined starting state by a reset signal 338, in order to detect the background signals in the subsequent dark period. With applying the reset pulse 338, the radiation pulse period is terminated simultaneously, which begins in this embodiment with the start of the integration in the integration windows 314 and 316 and in which both the distance and the reflectance and the background signal can be captured with a single laser pulse 304. In this embodiment, the start of the laser pulse coincides with the start of the integration, generally, however, the start time of the laser pulse can be different to the start time of the integration. In the subsequent dark period, a simultaneous closing of the shutter 252a for a first detection period 315 of the dark period having a duration $t_{int3}$ 304a and closing of the second shutter 252b for a second detection period of the dark period 317 with a duration $t_{int4}$ 316a is performed. In this embodiment, the duration $t_{int3}$ corresponds again to the pulse duration $t_p$ of the laser pulse in the radiation pulse period and the duration $t_{int4}$ of the time window 317 corresponds to the duration 316a of the time window 316 for integrating the whole reflected laser pulse. Generally, however, the duration of the integration window 314, 315 can be different to the pulse duration $t_p$. Then, analog to the above description, a voltage is formed at the sample capacitances 254a and 254b, which, however, in the dark period, corresponds only to the background light portion together with the reflectance r and the sensitivity R of the photodiode in the respective integration periods. In other words, during this dark period, the sub-cycles $I_B$ 308 and $II_B$ 310 mentioned in connection with FIG. 3 are performed in parallel. In this context, the contiguous radiation pulse period, i.e. the period where the integration for detecting the reflected radiation pulse is performed, can stretch to the beginning of the contiguous dark period, which follows in this embodiment. The dark period can begin with opening at least one of the two overlapping time windows, during the period where no radiation pulse is transmitted, and can be terminated after detecting the background light portion together with the reflectance r and the sensitivity R of the sensor. In other words, the radiation pulse period can begin with opening at least one of the two overlapping time windows for detecting the reflected radiation pulse and can be terminated after closing the last of the two overlapping time windows for detecting the whole reflected laser pulse.

During the phase C, a voltage $U_{1,extraneous}$ 320, which corresponds to the background signal during the time window 315, is formed at the sample capacitor 274a of the evaluation means 470. In this phase, the offset voltage, which is again applied to the feedback capacitor 284a, compensates the compensation voltage or offset voltage of the operational amplifier 280 and a differential voltage between $U_1$ and $U_{1,extraneous}$ plus a possible reference voltage 275 is applied to the output 299 of the evaluation means 470.

During the subsequent phase D, analogously, a voltage signal is output at the output 299 of the evaluation means 470, which corresponds to the difference of voltages $U_2$ and $U_{2,extraneous}$, plus a reference voltage 275. If the input 280c of the operational amplifier 280 is connected to ground, the reference voltage 275 corresponds to ground, and thus the relations derived in equation 3 or equation 6 result for the differential voltages applied to the output 299 in phases C and D. These differential voltage values can then be further processed, for example, in a camera system or on the chip or sensor, i.e. "on-chip", such that the quotient of the two differential voltages $U_{1,diff}$ and $U_{2,diff}$ is formed, and therefrom, as illustrated in equation 7 and equation 8, the distance of a pixel to a corresponding object point can be calculated.

Therewith, the parallel evaluation of all pixel elements arranged in a first row is completed in the evaluation means 470 associated parallel thereto column by column, and, by changing the select signal (diagram h) at the end of phase D, a second row in the pixel array can be read into the associated evaluation means 470. Since the initial reset signal 334 has been performed for all pixels of the array, the respective voltage values $U_{1,row2}$ 630 and $U_{2,row2}$ 632 for distance, reflectance, sensitivity and background portions during the radiation pulse are still on the sample capacitances 254a and 254b of the detection means 420. These voltage signals of the pixel are further processed in the newly selected 2" row in phases E and F analogously to the phases A and B in the evaluation means 470. By a row reset signal 610 for the CDS stage, voltages $U_{1,extraneous,row2}$ 635 and $U_{2,extraneous,row2}$ 637 regarding the background light portion, the reflectance r and the sensitivity R are detected in respective time windows 612 and 614 in phases G and H and further processed as described above. Successively, the residual rows of the pixel array can be read out analogously.

In the embodiment of the present invention illustrated in FIG. 5, the sample and hold circuit 550 for simultaneously capturing the distance and reflectance components is implemented twice. Likewise, the sample capacitances 274a and 274b and the feedback capacitances 284a and 284b of the evaluation means 470 exist twice. In this embodiment, the intermediate amplifiers or buffer amplifiers 134 and 264 each exist only once. In another embodiment, these intermediate amplifiers can also be implemented twice or in parallel, whereas the sample capacitances 274a and 274b can also be combined to one sample capacitance 274.

Contrary to the conventional apparatus and the method illustrated in connection with FIGS. 2 and 3, where the shutter signals for closing and opening the time windows were applied one after the other, with the embodiment illustrated in FIGS. 5 and 6 shutter signals for the time windows for integrating a signal formed in dependence on the received light can be applied in parallel. The voltage currently applied across the photodiode 130 is detected four times in the overall measurement cycle. First, by means of shutter 1 252a, the signal proportional to the distance for the signal cutting the laser pulse is stored on $C_{H1}$ 254a. Then, after a maximum waiting time that depends on the measurement range depth, with the help of shutter 2 252b the signal proportional to the reflectance and sensitivity corresponding to the complete reflected laser pulse is stored on $C_{H2}$ 254b. For obtaining the different signal portions and the correction of the additive background light and the components of the multiplicative error by the object reflectances, equations 1-8 apply. Obtaining the distance and reflectance signals is performed in a temporally parallel manner and no longer one after the other. The voltages $U_1$ 318 and $U_2$ 322 each include an additive extraneous light portion $E_{extraneous}$ and a multiplicative portion depending on the reflectance r of the detected object point (see equation 1 and equation 2). These analog signals are subtracted from each other directly on the image sensor chip, in the evaluation means 470, with very high accuracy. This is performed in the evaluation means 470, which is a circuit for correlated double sampling (CDS stage). The measurement cycle illustrated in FIG. 6 includes the picture of a complete three-dimensional depth chart. It begins with simultaneously exposing all pixels in a distance measurement phase. As representative for all pixel signals, the voltages $U_{1,2}$ are shown for one implemented pixel of the sensor matrix. After switching off or opening the shutter 1 252a and the shutter 2 252b, the voltages proportional to the distance or reflectance corresponding to the respectively detected signals are applied to the capacitances $C_{H1,H2}$ (254a and 254b). Then, the pixel matrix is read out row by row to the associated coupling or memory capacitance $C_{F1,F2}$ in the CDS stage in the phase readout row 1, readout row 2, . . . up to readout row K with K sensor rows. In this embodiment (FIG. 6) this applies in a column-parallel arrangement of the CDS stages, as here all values of a row K are transmitted simultaneously to the respectively associated column amplifiers. The clock signals $\Phi_{1a,1b}$ and $\Phi_3$ transmit the signals proportional to the laser to the column or sample capacitances $C_{S1,S2}$ 274a, 274b in phases A and B. Then, in phases C and D, the pixels of the respectively selected row are reset by means of reset 338, in order to obtain the additive background light portions both of the signal proportional to the distance and the signal proportional to the reflectance. In phases C and D, these signals are stored on sample capacitances $C_{S1,D2}$ 274a, 274b. Simultaneously, by activating the clock signals $\Phi_{2a,2b}$, the difference of the voltages from phases A and C and B and D is stored on the hold or feedback capacitances $C_{F1,F2}$ 284a, 284b. For this purpose, $C_{F1,F2}$ were previously reset by means of the clock signal $\Phi_5$. During a multiple accumulation, resetting can be performed once at the beginning of the accumulation sequence in or prior to the radiation pulse period in the distance measurement phase 620. In the subsequent accumulation sequence, no reset is performed any more. In FIG. 6, the case for a single accumulation is shown, but the presented double shutter method is also suitable for multiple accumulation without limitation. Since the measurement in the inventive methods or in the inventive apparatus is performed simultaneously, also for the reflectance values, the extraneous light portions due to the background light are correlated with almost 100%, and the portions due to the reflectance with almost 100%. These voltages proportional to the reflectance r can be read out serially in the further process and the quotient of the voltages $U_{1,diff}$ and $U_{2,diff}$ can be calculated according to equation 7 externally in the camera system or on-chip.

Figure 7:
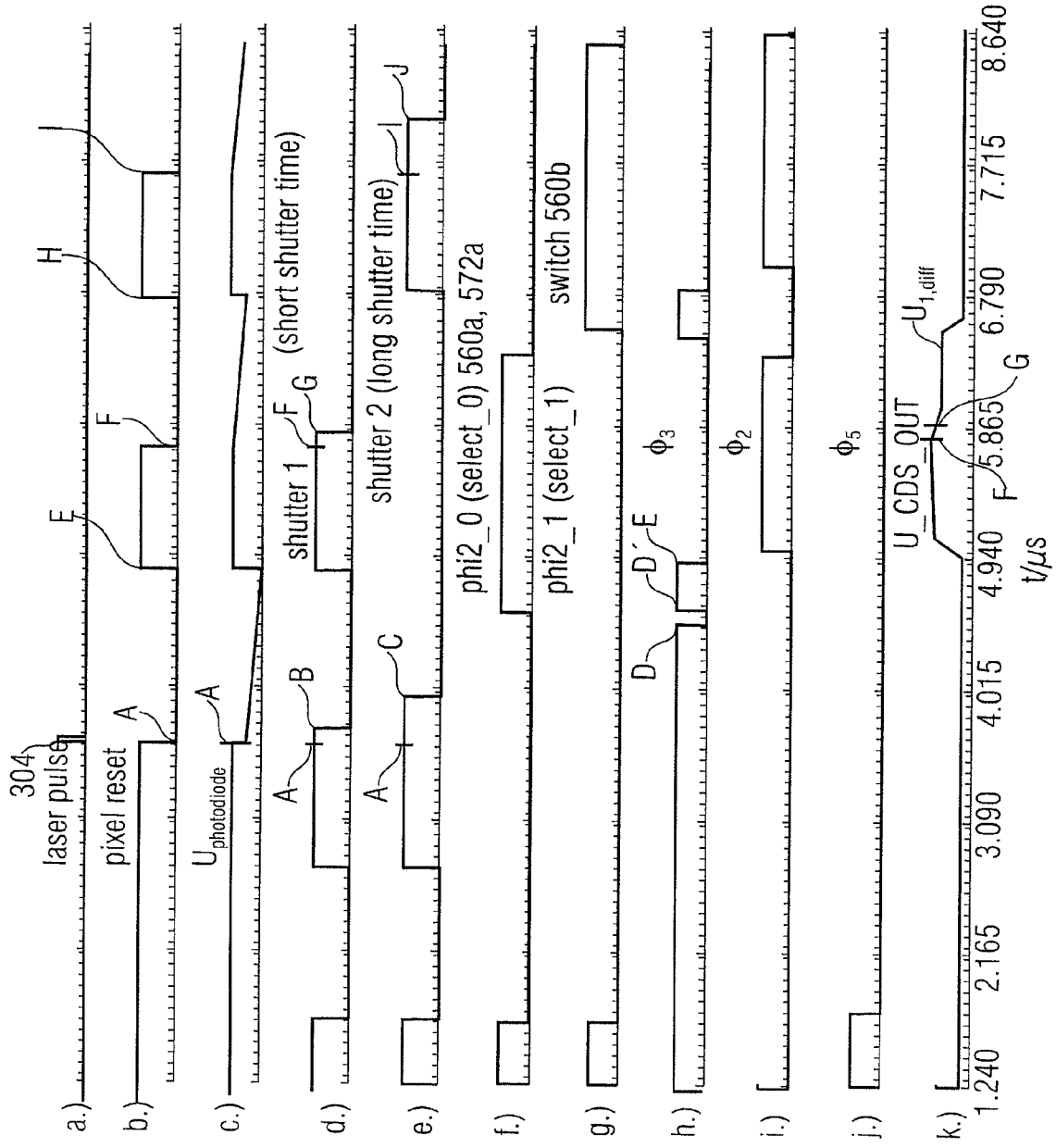
FIG. 7 is a simulated time diagram for illustrating the mode of operation of embodiments of the present invention.

FIG. 7 shows a simulated time circuit diagram, which is to be discussed, based on the embodiment of FIG. 5. In the circuit diagrams a-k, in FIG. 7, a time t is plotted in microseconds on the x-axis. In this simulation, the time axes are, for example, plotted from 1.24 μs to 8.64 μs. The respective y-axes of the diagrams a-k represent light impulses, signal impulses, voltage or switching states in arbitrary units.

Prior to the begin of the accumulation cycle, as illustrated in diagram j, switches 190a and 290b (FIG. 5) are closed in order to charge the feedback capacitance 284a and 284b to a defined reference voltage 275. In a different embodiment, the circuit can only have one switch 290 for charging the feedback capacitances to a defined reference voltage 275 in response to a control signal $\phi_5$. Prior to emitting the laser pulse (diagram a), a synchronous pixel reset takes place for all pixels. This is indicated in FIG. 7 in diagram b by the pixel reset value set to a logical "1". As has already been described above, the barrier layer capacitance 132 (FIG. 5) connected in parallel to the photodiode is set to a defined reset voltage value 229 by the pixel reset. In diagrams d and, the shutter 1 252a and the shutter 2 252b are closed partly temporally overlapping with the pixel reset signal. I.e. they are on a logical "1" level. From time A onwards, after the pixel reset is terminated and thus goes to a logical value "0", i.e. the respective reset switch 227 is opened, the voltage value at the barrier layer capacitance 132 decreases, and likewise, since shutters 1 and 2 are closed, at the respective sample capacitances $C_{H1}$ 254a and $C_{H2}$ 254b. Starting from the time A, the integration phase or opening of the first and second time windows for integrating the laser pulse 304 begins. At a time B, the first integration period lasting from time A to a time B having a first duration $t_{int1}$ is closed and a respective voltage $U_1$ is temporarily stored on a sample capacitance, for example 254a. The temporarily stored voltage $U_1$ includes, as already mentioned above, information on the distance, reflectance and sensitivity of the sensor and the background light portion. The first duration $t_{int1}$ given by the period between times A and B is to be selected such that the integrated reflected laser pulse is partly cut off to obtain distance information on the object to be measured. The second switch 252b (FIG. 5) can then be closed at a time C, as is shown in diagram e. Thereby, the duration of the second integration time $t_{int2}$ is longer than the first duration $t_{int1}$ of the first detection period and long enough to integrate the whole reflected laser pulse. I.e. the integration time $t_{int2}$ given by the period between the times A and C is longer than a pulse width of the emitted laser pulse. After closing the second window, i.e. opening the second shutter 252b, a respective voltage $U_2$ is "frozen", for example on the sample capacitance $C_{H2}$ 254b. Since the shutter window has a duration $t_{int2}$ that is longer than the duration of the laser pulse and hence the whole pulse form of the laser is integrated, this voltage value $U_2$ contains no longer any distance information since this is obtained by "cutting off" the received laser pulse. Rather, again the background light portion and the laser portion are captured together with information on reflectance and sensitivity of the sensor. After closing the second time window or opening the second shutter, the radiation pulse period is terminated in this embodiment. The respective voltage values $U_1$ and $U_2$ are temporarily stored on the sample capacitances 254a and 254b.

As is illustrated in diagram f (FIG. 7), by closing the switch 560a, which, in deviation from the embodiment in FIG. 5, has no AND logic gate, a connection with a CDS stage can be made. Thus, in embodiments, it is not necessitated that the circuit comprises a select switch 255. Simultaneously with the switch 560a, the switch 572a is closed, so that the voltage $U_1$ can be formed at the sample capacitance 274a of the evaluation means 470. As is illustrated in diagram h, the switch 282 is closed by the control signal $\Phi_3$ prior to and during integration, in order to charge the voltage value on the feedback capacitances 284a and 284b to an offset voltage of the operational amplifier 280 and to stabilize the same. Opening of the switch 282 at the time D and renewed closing of the switch 282 at the time D' shown in diagram h can also be omitted. At the time E, the switch 282 is opened in response to a control signal $\Phi_3$, the logical value is therefore "0". In this phase, a pixel reset takes place again (diagram b) and the shutter 1 252a is also closed again (diagram d), so that the reset voltage $V_{reset}$ 229 can again be formed at the barrier layer capacitance 132 of the pixel 125 and the sample capacitance 254a. By closing the switch 288 in response to a control signal $\Phi_2$, as is illustrated in diagram i, the feedback capacitance 284a is again coupled to the operational amplifier 280. Thereby, the feedback capacitor 284a charges to a differential voltage, which is given by the voltage at the sample capacitor 274a and the reference voltage 275 of the operational amplifier 280 minus a starting voltage of the operational amplifier. This voltage is applied to the output of the CDS stage 299, as can be seen in diagram k. After terminating the pixel reset at time F and opening the shutter 1 252a at time G, the integration of the first time window is terminated without a laser pulse, i.e. in the dark period. Since the switches 560a and 572a are still closed, as can be seen in diagram f, the voltage $U_{1,extraneous}$, i.e. the voltage without laser pulse portion, is applied to the sample capacitor 274a of the evaluation means 470, such that the difference of voltages $U_{1,diff}=U_1-U_{1,extraneous}$ is formed at the time G at the output of the CDS stage, as can be seen in diagram k.

In the following, the CDS stage is reset by opening the switch 288 by a control signal $\Phi_2$ and by closing the switch 282 in response to a control signal $\Phi_3$. Beforehand, by opening switches 560a and 572a, the sample capacitance 274a of the CDC stage was decoupled from the sample capacitance 254a of the sample and hold circuit. By closing switches 560b and 572a, analogously to the voltage value $U_1$ also the voltage $U_2$ that is still temporarily stored in the sample capacitance 254b is now transmitted to the CDS stage. By closing the switch 227, a pixel reset is performed again in the period H to I and analogously the second shutter 252b is closed, so that the background light portion is detected without a laser pulse in the second detection period $t_{int2}$, here ranging from time I-J. The respective voltage signal is then transmitted to the CDS stage while switches 560b and 572a are still closed, and there, analogously to the voltage difference $U_{1,diff}$, the differential voltage $U_{2,diff}$ is formed which is then applied to the output 299 of the CDS stage from the time J onwards. The formation of this voltage value $U_{2,diff}$ is no longer shown in the simulation.

In this embodiment, the subtraction of the respective voltage values takes place serially of the CDS stage. This means that first the differential voltage value $U_{1,diff}$ is formed with and without laser pulse portion for the time window having a shorter integration time $t_{int1}$, and subsequently, serially, the differential voltage $U_{2,diff}$ is formed for the second time window with the longer integration period $t_{int2}$, with and without laser pulse. For this reason, the CDS stage in this embodiment can be implemented serially instead of in parallel, i.e. the same can have only one switch 572 and one sample capacitance 274 as well as one switch $\Phi_2$ and $\Phi_5$ and only one feedback capacitance 284.

Figure 8:
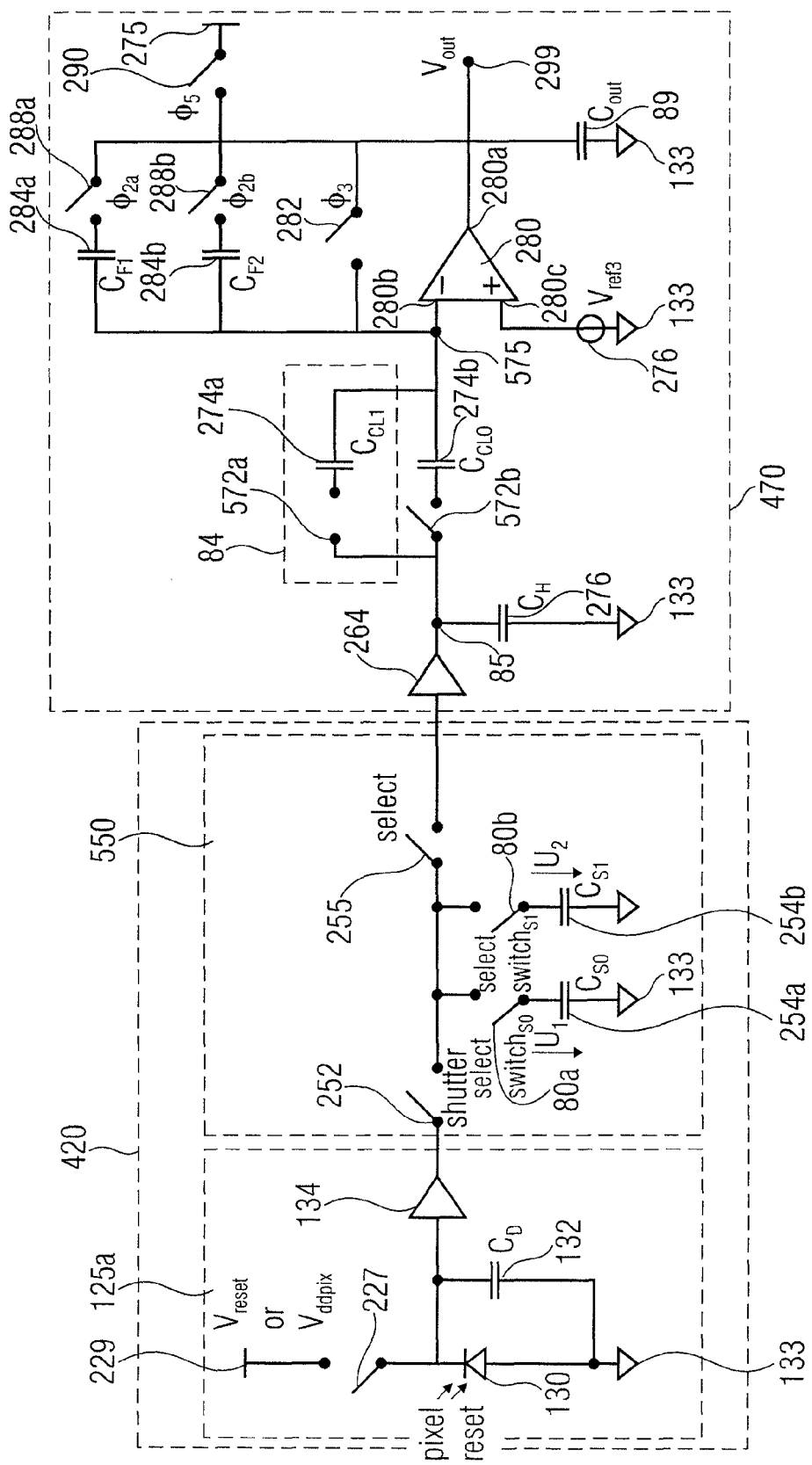
FIG. 8 is a circuit for an optical distance measuring device or an apparatus for distance measurement with double sampling according to a further embodiment of the present invention.

As a further embodiment, FIG. 8 shows the circuit diagram of a detection means 420 and an associated evaluation means 470. In this embodiment, the evaluation means 420 consists again of a pixel element 125a, which is structured, as already described in the context of FIG. 5, i.e., a photodiode 130 having a barrier layer capacitance 132 connected in parallel is connected to ground 133 with one terminal and connected to a buffer amplifier 134 and the pixel reset switch 227 with the other terminal. The pixel reset switch 227, also called reset switch 227 in this application, charges the pixel capacitance in the closed state to the predefined reset voltage $V_{reset}$ 229. The buffer 134 can be a voltage follower having an amplification of ×1 or also a buffer possibly having a higher amplification than ×1. Apart from that, the detection means 420 has a sample and hold circuit 550, which is connected to the output of the buffer 134 and hence to the pixel element 125a via the switch 252 and the shutter. In this embodiment, the sample and hold circuit 550 has two sample capacitance 254a and 254b that are each connected to ground 133 with one terminal and connected to the input of the sample and hold circuit with the other terminal each via switches 80a and 80b via the shutter 252. Hence, in this embodiment, the sample capacitances 254a and 254b are not arranged in parallel, but are coupled to a common signal path via a node, as can be seen in the circuit diagram in FIG. 8. Additionally, the two sample capacitances 254a and 254b are again connected to a subsequent circuit for correlated double sampling (CDS stage) 470 via a select switch 255.

The circuit for (correlated) double sampling 470 has a hold capacitance 276, which is, on the one hand, connected to ground 133 and, on the other hand, connected to the buffer amplifier 264 at the input of the CDS stage 470. The circuit for (correlated) double sampling 470 has a sample capacitance $C_{c10}$ 274b, which is, on the one hand, connected to the hold capacitance 276 via a switch 572b via the node 85 and, on the other hand, is connected to the output of the buffer amplifier 264. Optionally, a second parallel branch with a switch 572a and a second sample capacitance 274a can be arranged. However, this parallel branch 84 is optional, since the evaluation in the CDS stage 470 is performed serially if only one operational amplifier 280 per double shutter pixel 420 is used. If the CDS stage has only one sample capacitance, the detection of the background light portion in the dark period can only be performed serially, i.e., the respective detection periods do not overlap as shown in diagrams f and g in FIG. 7. In two overlapping detection periods during the dark period, two sample capacitances 274a and 274b are necessitated for temporarily storing the voltage values in the CDS stage, as is shown in FIG. 5 and FIG. 8 (optional). Further, the evaluation means 470 has again two feedback capacitances 284a and 284b arranged in parallel and connected to the sample capacitances 274a (optional) and 274b via a node 575. Further, the node 575 is connected to the "non-inverting" input 280b of the operational amplifier 280. Via the switch 282, the operational amplifier can be short-circuited in response to a control signal $\Phi_3$. The feedback capacitances 284a and 284b can be connected to the output 280a of the operational amplifier via the feedback switches 288a and 288b, or can be connected to the reference potential 275 via a reference potential switch 290, in response to a control signal $\Phi_5$. The output voltage $V_{out}$ of the evaluation means 470 is applied to the output 299, wherein the output signal can be smoothed via an output capacitor $C_{out}$ 89. The inverting input 280c of the operational amplifier 280 can be on an offset potential 276.

This embodiment is distinguished by a space requirement reduced by approx. 50% and a power consumption reduced by approx. 50% per double shutter pixel compared to conventional pixels with a sample and hold circuit. In this embodiment, after closing the shutter 252 in the sample capacitances 254a and 254b, the reflections of the radiation pulse at an object surface and a background radiation are captured together with the reflectance and sensitivity portions during the radiation pulse period once in a short integration time $t_{int1}$, i.e. in a first shutter time, and in a second integration time $t_{int2}$ that is longer than the first integration time and overlaps with the same, the influence of the whole reflected radiation pulse on the voltage is captured, i.e., a short and a long shutter time are realized in one pixel path that is, contrary to the embodiment in FIG. 5, not implemented in parallel. One advantage of this embodiment is, as has already been mentioned above, the reduced space and power requirement, as well as an improved noise behavior, since the reset noise and the SF1 noise is the same for both shutter times (integration time $t_{int1}$, $t_{int2}$). The voltage values $U_1$ and $U_2$ applied to the sample capacitances 254a and 254b can be evaluated at the CDS stage 470, as described above. In this embodiment, the whole distance measurement with a short and a long shutter time, each with and without a laser pulse, can be detected in one pixel path. Additionally, the background light for all pixels of a pixel array can be detected within one shutter time and does not have to be performed serially row by row as in other embodiments, which can lead to a shortening of the measuring time for the distance measurement. Since, as will be discussed in more detail below, the laser and background light portions are detected within one shutter time, the correlation is increased and can therefore be almost 100%. Additionally, the measurement time is shortened compared to other embodiments and conventional methods.

Figure 9:
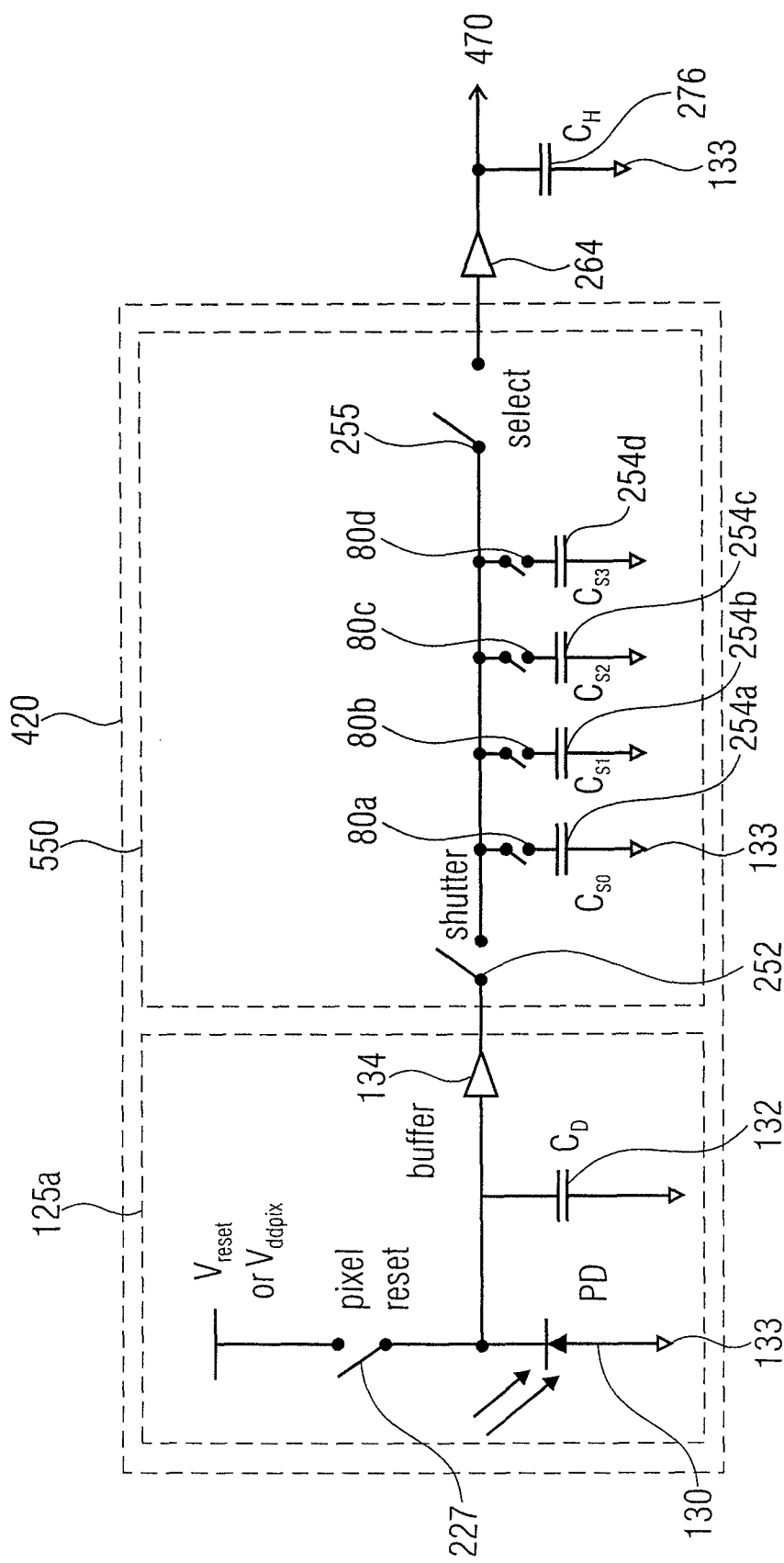
FIG. 9 is a further circuit for an optical distance measuring device or an apparatus for distance measurement with double sampling according to a further embodiment of the present invention.

In a further embodiment, FIG. 9 shows a detection means 420 in the form of a circuit diagram. Again, the detection means 420 comprises a pixel element 125a as well as a sample and hold circuit 550. In this embodiment, the sample and hold circuit 550 has four sample capacitances $C_{S0}$, $C_{S1}$, $C_{S2}$ and $C_{S3}$ with the respective numbering 254a-254d. The same are connected to ground on one terminal side and on the other terminal side connected to the shutter 252 via nodes of the pixel path each via select switches 80a-80d.

The same is coupled to the pixel element 125a via the buffer amplifier 134. Further, the sample and hold circuit 550 has again a select switch 255 that can couple the sample capacitances to a downstream evaluation means 470 via their respective select switches 80a-80d. Again, the evaluation means 470 can be a CDS stage, as described in embodiments, for example in FIG. 8. With this circuitry for the sample circuit it is possible to reduce the space and power requirement compared to conventional sample and hold circuits for distance measurement and, additionally, both the reset noise and the noise SF1 for all sampled voltages is the same, both for the background and for the laser exposure. As will be shown below in FIGS. 10 and 11, with this embodiment, the background light in a dark period can also be detected for all pixels within one shutter time and does not have to be read out serially row by row. This can reduce the measurement time and the correlation of the laser and background light within one shutter time can be increased to almost 100%. The whole measurement with a short and a long shutter time, with and without a laser pulse, can be realized in one pixel path and within one shutter time. Additionally, the background light portion can be subtracted with an extrapolation method, as will be described below in more detail.

Figure 10:
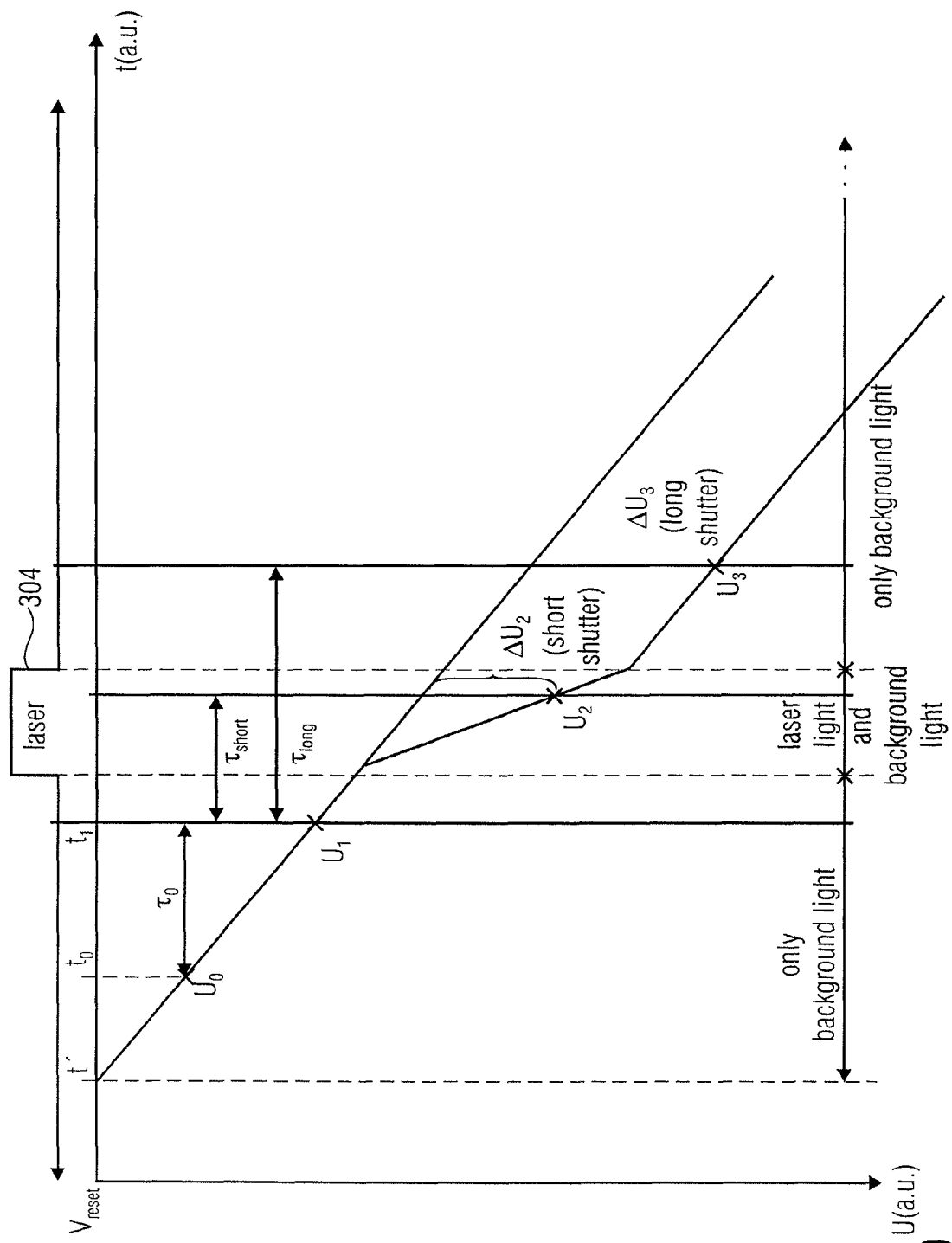
FIG. 10 is a schematic voltage time diagram for illustrating the extrapolation of the background light portion with the help of the circuit illustrated in FIG. 9 and FIG. 8.

FIG. 10 illustrates in a diagram how, according to a further embodiment of the present invention, the background light can be determined with an extrapolation method. In FIG. 10, the time t is plotted in arbitrary units on the x axis, and the voltage signal U at the barrier layer capacitance 132 of the photodiode 130 is plotted on the y axis. After terminating a pixel reset at the time t', a predefined voltage value $V_{reset}$ is applied to the barrier layer capacitance of the pixel element 125a. In the dark period following in this embodiment, where no laser pulse is emitted, the voltage decreases merely by the background light. For extrapolating the background light, the time curve of this voltage is measured at four measurement points $U_0$, $U_1$, $U_2$ and $U_3$ and temporarily stored on respective sample capacitances $C_{s0}$, 254a, $C_{s1}$ 254b, $C_{s2}$ 254c and $C_{s3}$ 254d (FIG. 9). As is further shown in FIG. 10, first, at a time $t_0$, the voltage $U_0$ is temporarily stored on a first sample capacitance, for example 254a. The storage of the individual values takes place, as has already been described, by respectively closing the switches 80a-80d associated to the sample capacitances. At a second time $t_1$, the voltage value $U_2$ is temporarily stored on a second sample capacitance 254b. Between the times $t_0$ and $t_1$, a time interval of a length $\tau_0$ has passed. Then, the individual voltage values are temporarily stored with the help of a sensor control or controller by controlling and opening the respective select switches 80a-80d at the respective time, and "freezing" the respective voltages on the respective sample capacitances.

After temporarily storing the voltage value $U_1$, the dark period is terminated. For the subsequent radiation pulse period, in which the reflected laser pulse 304 is detected, a short integration period $\tau_{short}$ is started by closing, for example, switch 80c, and a long integration period $\tau_{long}$ by closing switch 80d in a phase-locked manner with respect to the laser pulse 304. The shorter of the two detection periods in this radiation pulse period is closed after an integration time $\tau_{short}$, such that the reflected laser pulse is partly "cut off" in order to obtain the desired distance information. For this purpose, the voltage $U_2$ is further temporarily stored, for example on the sample capacitance $C_{s2}$, when closing the switch 80c. The second time window with an integration time $\tau_{long}$ is longer than the duration of the laser pulse, so that the whole pulse form of the laser is integrated. The respective voltage value $U_3$ is then temporarily stored, for example, on the sample capacitance 254d. The voltage values $U_0$, $U_1$, $U_2$ and $U_3$ can be measured as described above, and the values $\Delta U_2$ and $\Delta U_3$, i.e. the "net signals" due to the laser exposure that are needed for calculating the distance of an object can be calculated therefrom. The background light portion of the voltage decrease can be extrapolated by the following equation:

$$U_{background}(t) = U_0 - \frac{U_0 - U_1}{\tau_0} \cdot t + \frac{U_0 - U_1}{\tau_0} \cdot t_0 \tag{9}$$

In equation 9, the voltage values $U_0$ and $U_1$ can be measured and the time values $t_0$ and $\tau_0$ can be adjusted or are known. With the help of equation 9, $\Delta U_2$ can be calculated according to the following equation:

$$\Delta U_2 = U_2 - U_1 + (U_0 - U_1) \cdot \frac{\tau_{short}}{\tau_o} \tag{10}$$

In the same manner, $\Delta U_3$ can be calculated:

$$\Delta U_3 = U_3 - U_1 + (U_0 - U_1) \cdot \frac{\tau_{long}}{\tau_o} \tag{11}$$

The double shutter principle with a single exposure time can also be applied to the background light compensation. All pixels of a pixel array can compensate the background light portion with the help of this extrapolation method in a single dark period. As has been described above, the voltage values temporarily stored on the sample capacitances 254a-254d can be subtracted in the following CDS stage 470 in order to obtain the distance information.

Figure 11A:
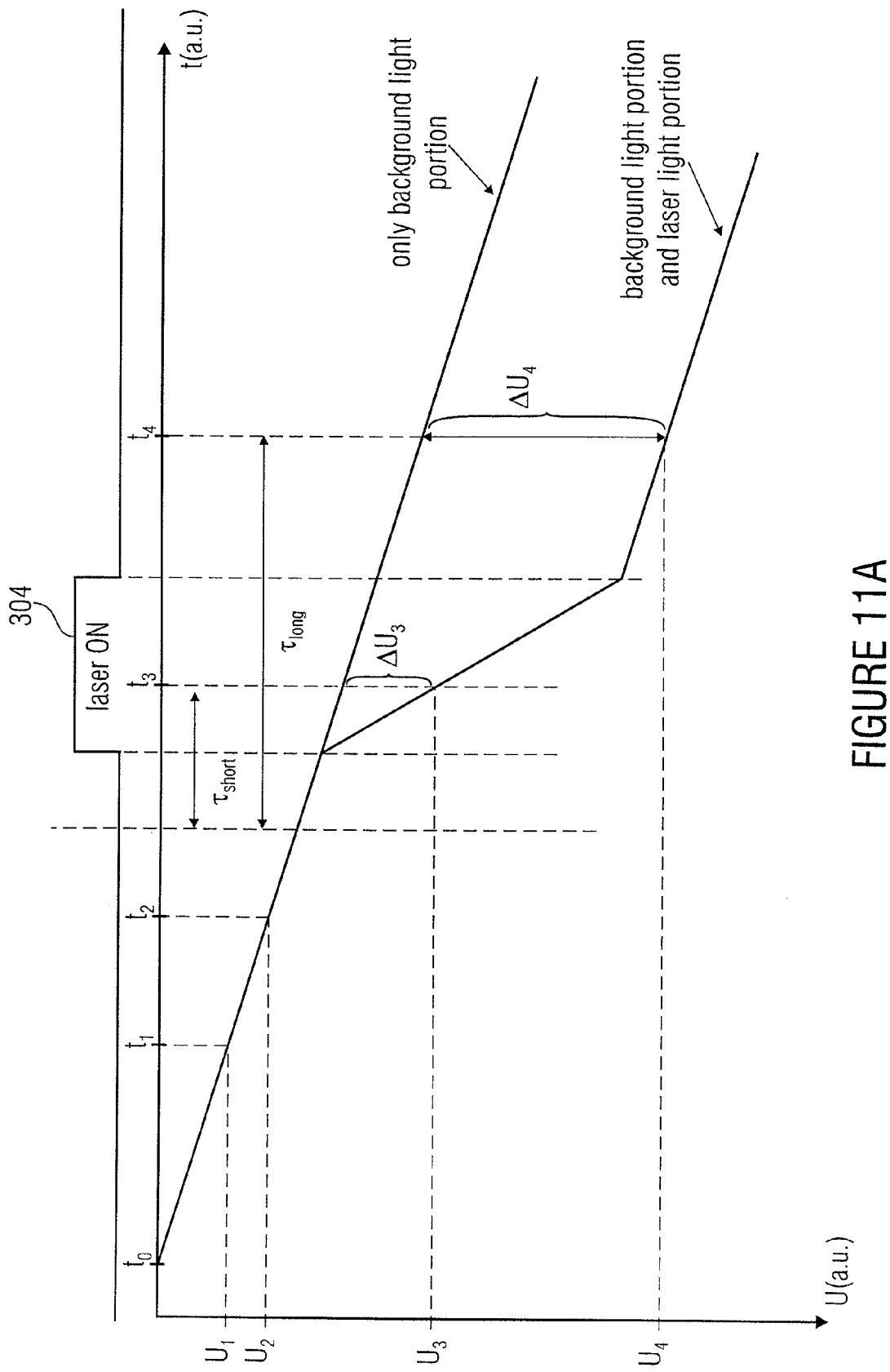
FIG. 11a is a further schematic voltage time diagram for illustrating the extrapolation of the background light portion with the help of the circuit illustrated in FIG. 9 and FIG. 8.

FIG. 11a illustrates in a further embodiment a more general version of the extrapolation method for the background light portion. In this embodiment, the second voltage $U_2$ (FIG. 11a) for the extrapolated background light is not sampled at the starting point of the integration of the laser pulse during the radiation pulse period. This can be performed at any time within the previous dark period.

As described in the context of FIG. 10, the time t is plotted in arbitrary units on the x axis, and the voltage applied to the photodiode in arbitrary units on the y axis. Contrary to the embodiment in FIG. 10, the voltages $U_1$ and $U_2$ can be measured at any time in the dark period and temporarily stored on the respective sample capacitances of the sample and hold circuit 550. For this purpose, for example at time $t_1$, the voltage $U_1$ can be temporarily stored on the sample capacitor $C_{s0}$ (FIG. 9), and a second voltage value $U_2$ on a second sample capacitance, for example $C_{s1}$, at a second time $t_2$ in the dark period. It follows that in this embodiment the voltage changes at the photodiode due to the background light portion are measured in the dark period in two overlapping detection periods and "frozen" based on two voltage values $U_1$ and $U_2$. In a radiation pulse period, then two detection periods for the laser pulse are coupled in a phase-locked manner at the time of emitting the laser 304. A first detection period having an integration time $\tau_{short}$ or $t_{int}$ partly cuts off the reflected laser pulse, i.e. the time window is closed before the laser pulse has been completely integrated. Rather, this takes place in the second detection period having a duration $\tau_{long}$ or $t_{int2}$ that is at least as long as the laser pulse. After closing the first detection period for integrating the reflected laser pulse at the time $t_3$, the respective voltage $U_3$ is temporarily stored, for example, on the sample capacitance $C_{s2}$. This means that the voltage value $U_3$ including the distance information to the object is applied to this sample capacitance. The voltage value $U_4$ is then temporarily stored, for example, on the sample capacitor $C_{s3}$ by closing the second time window having the duration $\tau_{long}$. The starting times of the first and second time windows for the radiation pulse period can be phase-locked with the laser pulse 304.

By this method, the voltages $U_1$ to $U_4$ can be temporarily stored on the respective sample capacitances. Then, the net signals can be determined based on the laser exposure, i.e. $\Delta U_3$ and $\Delta U_4$.

For changing the voltage by the background light portion, the following functional context applies:

$$U_{background}(t) = mx + b =: U_H(t) \quad (12)$$

The functional context between voltage and time can, therefore, be described by a linear equation. Applied to FIG. 11a, this means that the slope of the straight line can be illustrated by the voltage difference of the voltage values $U_2$ and $U_1$ divided by the respective time differences $t_2-t_1$ at a respective time t minus time offset $t_1$ and voltage $U_1$.

This is illustrated in equation 13:

$$U_H(t) - U_1 = \frac{(U_2 - U_1)}{t_2 - t_1} \cdot (t - t_1) \quad (13)$$

This equation can be rearranged as follows:

$$U_H(t) = \frac{U_2 - U_1}{t_2 - t_1} \cdot t - \frac{U_2 - U_1}{t_2 - t_1} \cdot t_1 + U_1 = \quad (14)$$

$$= \frac{U_1 - U_2}{t_2 - t_1} \cdot t + \frac{U_1 - U_2}{t_2 - t_1} \cdot t_1 + \frac{U_1 t_2 - U_1 t_1}{t_2 - t_1} =$$

$$= \frac{U_1 - U_2}{t_2 - t_1} \cdot t + \frac{U_1 t_1 - U_2 t_1 + U_1 t_2 - U_1 t_1}{t_2 - t_1} =$$

$$= -\frac{U_1 - U_2}{t_2 - t_1} \cdot t + \frac{U_1 t_2 - U_2 t_1}{t_2 - t_1}$$

so that the following linear equation results for the functional context of voltage $U_H(t)$:

$$U_H(t) = -\frac{U_1 - U_2}{t_2 - t_1} \cdot t + \frac{U_1 t_2 - U_2 t_1}{t_2 - t_1} \quad (15)$$

With this functional context, the voltage value can be calculated or extrapolated based on the pure background light portion at any time t.

$\Delta U_3$ can then be easily determined by using the temporarily stored voltage value $U_3$ and equation 15. For $\Delta U_3$, the following results:

$$\Delta U_3 = U_3 - U_H(t_3) = U_3 + \frac{U_1 - U_2}{t_2 - t_1} \cdot t_3 - \frac{U_1 - U_2}{t_2 - t_1} \cdot t_1 - U_1 \quad (16)$$

After further rearrangement, equation 17 results:

$$\Delta U_3 = U_3 - U_1 + \frac{U_1 - U_2}{t_2 - t_1} \cdot (t_3 - t_1) = \quad (17)$$

$$= U_3 - U_1 + (U_1 - U_2) \cdot \frac{t_3 - t_1}{t_2 - t_1}$$

$\Delta U_3$ can therefore be determined by the difference of voltage values $U_3$ and $U_1$ and the difference of voltage values $U_1$ and $U_2$, as well as the respective differences of the times $t_3-t_1$ divided by $t_2-t_1$. These times can be adjusted by the sensor control and can be considered to be known, since the same correspond to the respective time window of the shutter. Analogously, $\Delta U_4$ can be calculated, such that equation 18 results:

$$\Delta U_4 = U_4 - U_H(t_4) = U_4 - U_1 + (U_1 - U_2) \cdot \frac{t_4 - t_1}{t_2 - t_1} \quad (18)$$

$\Delta U_4$ can again be calculated when knowing the difference of voltages $U_4$ and $U_1$ and the difference of voltages $U_1$ and $U_2$, as well as the difference of the respective times $t_4-t_1$ and $t_2-t_1$. The same can again be adjusted by the sensor control and are thus considered to be known. As described above, the voltage values $U_1$ to $U_4$ are now temporarily stored on the respective sample capacitances $C_{s0}$ to $C_{s3}$ 254a-254d, and the respective differences $U_3-U_1$, $U_1-U_2$ and $U_4-U_1$ can be formed, for example, by the CDS stage 470 connected to the sample and hold circuit 550 and temporarily stored on memory capacitances in the CDS stage for further processing. In other words, the voltage values necessitated for determining the distance to an object to be measured can be made available again.

Figure 11B:
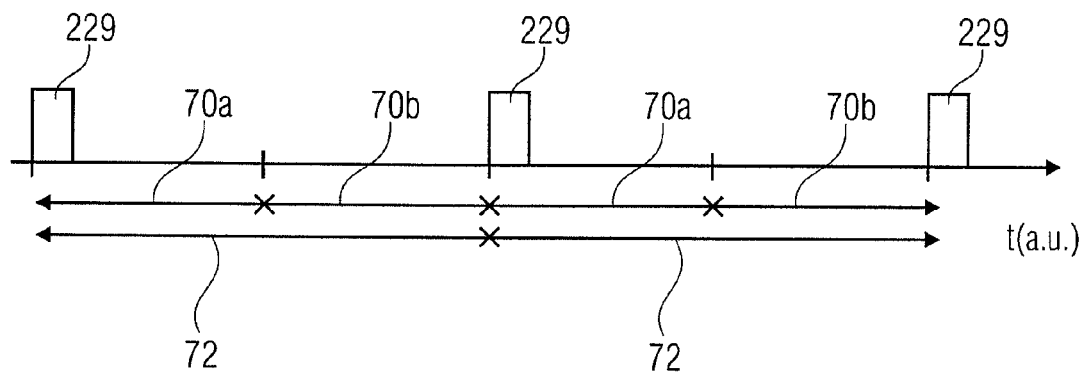
FIG. 11b is a schematic illustration regarding the reset phases for an apparatus according to embodiments of the present invention.
Figure 11B:
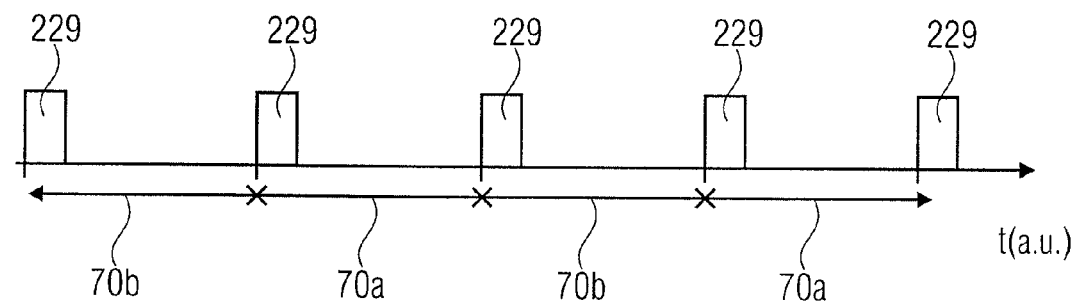

FIG. 11b shows exemplarily in two schematical time diagrams I and II two different options for resetting the pixel (pixel reset 229) during the dark period and the radiation pulse period according to embodiments of the present invention. On a time axis, where the time t is plotted in arbitrary units, a pixel reset 229 can be performed respectively prior to the beginning of a cycle 72 including a dark period 70a and a radiation pulse period 70b (diagram I). For a subsequent measurement cycle, again a common pixel reset 299 can be performed for the dark period 70a and the radiation pulse period 70b. In diagram II, however, prior to the beginning of every dark 70a or radiation pulse period 70b, a pixel reset is performed. For a subsequent measurement cycle, a pixel reset can be performed again separately for every radiation pulse period and every dark period. This has been discussed, for example, in the context of the embodiment in FIG. 6. The sequence and the relative duration of the radiation pulse periods 70a and the dark periods 70b can deviate from the illustrated arrangement. Hence, it is also possible that after a radiation pulse period several dark periods follow or that after one dark period several radiation pulse periods follow. Additionally, the radiation pulse periods and the dark periods do not have be directly adjacent in time, as shown in embodiments.

Figure 12:
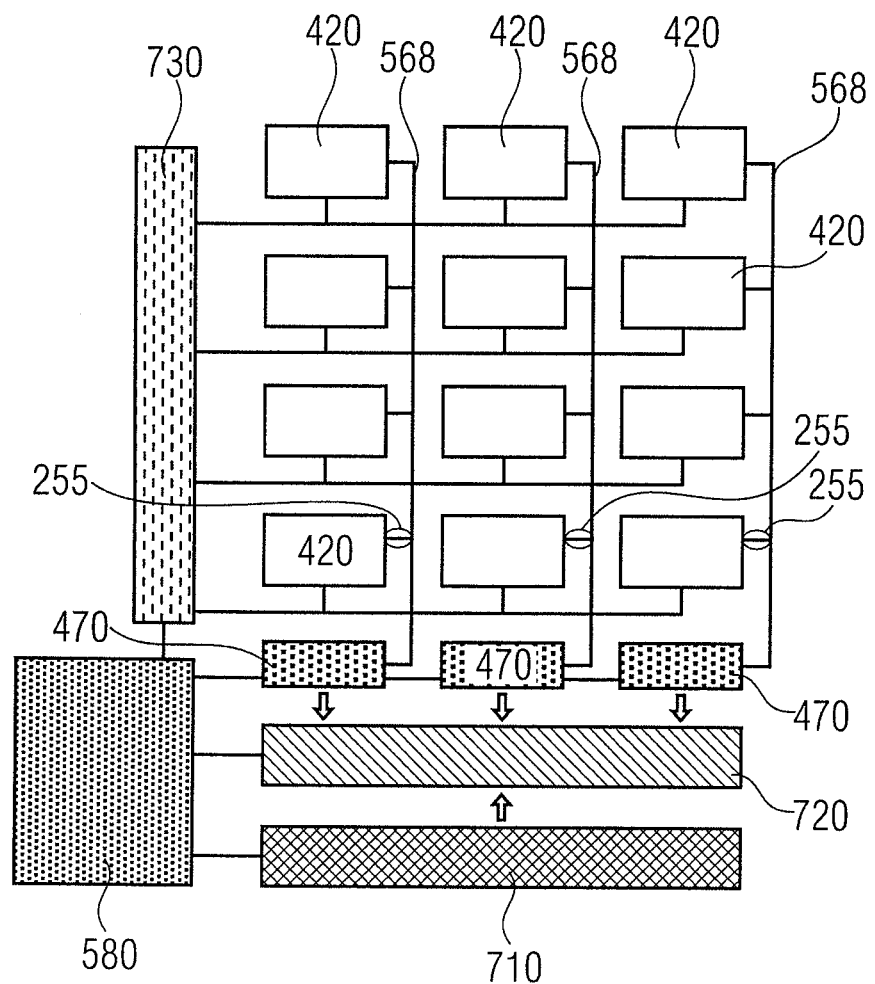
FIG. 12 is a block diagram of a double sampling measurement system according to an embodiment of the present invention having a plurality of distance measuring devices arranged in a matrix.

FIG. 12 shows schematically the structure of an image sensor and receiver consisting, for example, of a plurality of detection means 420 arranged in columns and rows, and evaluation means 470 each associated with the columns, rows or pixels. The receiver or image sensor can comprise a control logic 580, which generates, among others, the respective reset signals, control signals, and row and column select signals as described in the context of FIGS. 5 and 6. For this purpose, the receiver or image sensor or pixel array can have, among others, a column address decoder 710, a respective column multiplexer 720 or a shift register and, for example, a row address decoder 730. In response to a select signal, the pixels of one row are connected to the evaluation means 470 associated column by column or pixel by pixel. By the select signal, the switches 255 are connected to the respective read lines 568 and signals are passed on to the evaluation means 470 as described above. In this embodiment of the present invention, an apparatus or the detection means of an optical distance measuring device is connected in the form of a matrix or in an array, such that, for example, a sensor for three-dimensional distance measurement is formed. In other embodiments, different arrangements of the pixels are possible. Generally, an evaluation means 470 can be associated with a certain array of pixels or with every pixel individually. This means every pixel can have an associated individual evaluation means 470, i.e., for example, a circuit for (correlated) double sampling as described in embodiments.

Figure 13:
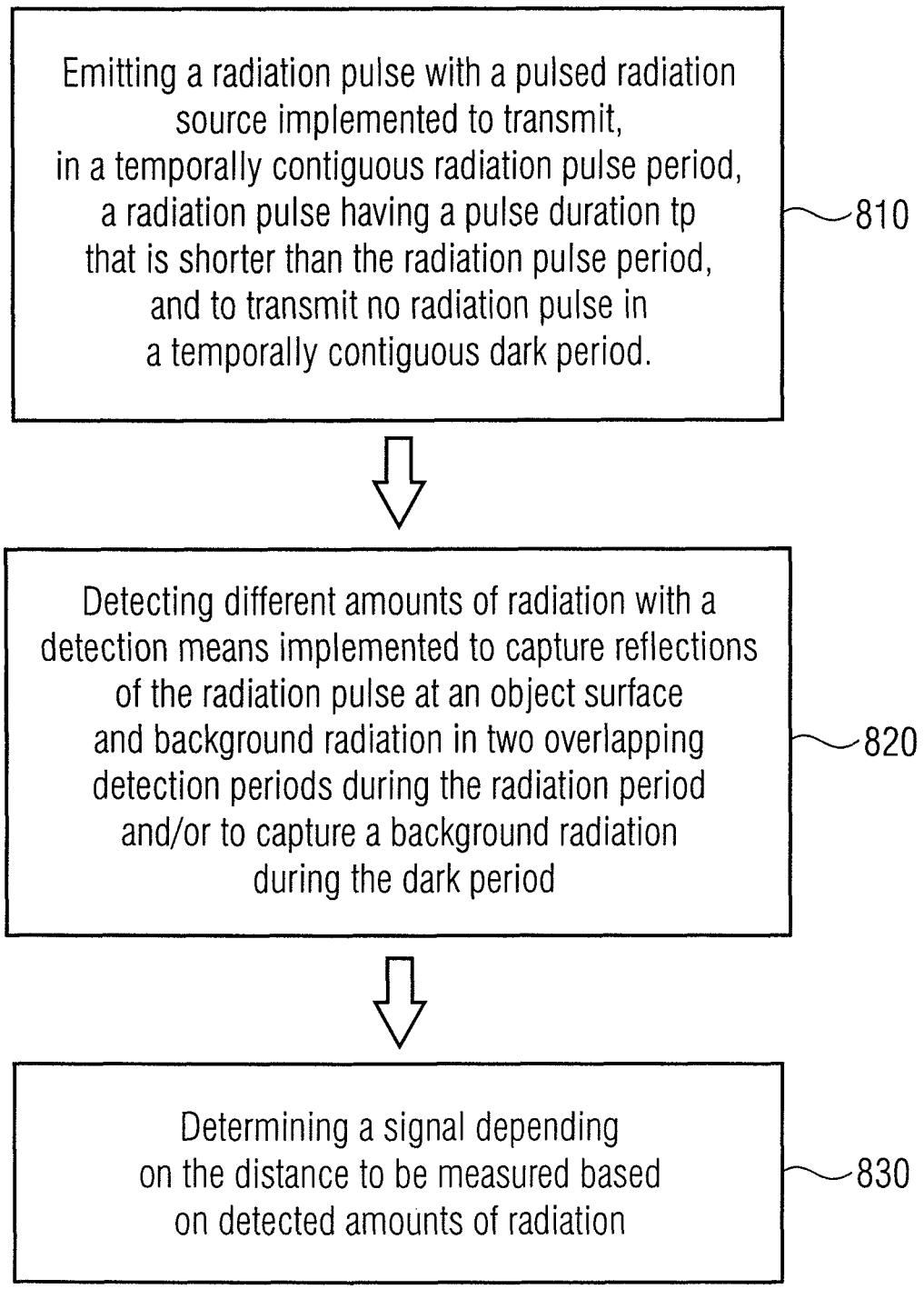
FIG. 13 is a flow diagram of the method for optical distance measurement according to an embodiment of the present invention.

FIG. 13 illustrates, in a block diagram, an embodiment of a method of optical distance measurement. According to one embodiment, the method comprises emitting 810 a radiation pulse with a pulsed radiation source implemented to transmit, in a temporally contiguous radiation pulse period, a radiation pulse having a pulse duration $t_p$ that is shorter than the radiation pulse period, and to transmit no radiation pulse in a temporally contiguous dark period. Further, the method comprises a step of detecting 820 different amounts of radiation with a detection means implement to capture reflections of the radiation pulse at an object surface and background radiation in two overlapping detection periods during the radiation pulse period, and/or to capture background radiation in two overlapping detection periods during the dark period. The method further comprises determining 830 a signal depending on the distance to be measured based on the detected amounts of radiation.

Emitting 810 can be performed, for example, such that, as described above, a pulsed laser beam or a pulsed LED beam is emitted. In another embodiment of the method for optical distance measurement, emitting 810 the radiation pulse and detecting 820 the different amounts of radiation is started in two overlapping detection periods during the radiation pulse period in a temporally synchronized manner, wherein in this embodiment a first detection period having a duration $t_{int1}$ has the pulse duration $t_p$, and a second detection period has a duration $t_{int2}$ that is longer than $t_p$ and/or, wherein detecting the different amounts of radiation in two overlapping detection periods during the dark period starts in a temporally synchronized manner after terminating the radiation pulse period, wherein a third detection period again having the duration $t_{int3}$ can have the pulse duration $t_p$, and the fourth detection period with the duration $t_{int4}$ has a duration $t_{int2}$ that is longer than $t_p$.

Detecting 820 the different amounts of radiation with a detection means and determining 830 a signal can be performed, for example, such that two charge amounts or voltage values detected in the two overlapping detection periods depending on the detected amount of radiation are temporarily stored in a detection means and signals depending on the distance to be measured are determined based on the temporarily stored charge or voltage values. In embodiments of the method for optical distance measurement, determining 830 a signal with a circuit for correlated double sampling is performed such that differential signals are determined from the reflections of the radiation pulse at an object and a background radiation in the two overlapping detection periods during the radiation pulse period and the background radiation detected in the two overlapping detection periods during the dark period.

In a further embodiment of the present invention, in a multiple sampling method, electrically coupling a first sample capacitance by means of a voltage follower circuit to an output of a capacitive pixel sensor element is performed during a first time window and electrically coupling a second sample capacitance by means of a voltage follower circuit to the output of the capacitive pixel sensor element is performed during a second time window. Thereby, the first and second time windows overlap, such that at the end of the first and second time windows different voltage signals describing a charge or discharge process of the capacitive pixel sensor element are applied to the first and second sample capacitances. This multiple sampling method can further comprise a step of subtracting of the voltage signal applied to the first sample capacitance at the end of a first period with the voltage signal applied to the first sample capacitance at the end of a second period, and the voltage signal applied to the second sample capacitance at the end of the first period with the voltage signal applied to the second sample capacitance at the end of a second period. The first period can, for example, be the radiation pulse period, and the second period can be the dark period.

In one embodiment of the present invention, the detection means 420 is implemented as a pixel sensor element 125a, wherein the pixel sensor output is connected to the sample and hold circuit 55o implemented in parallel via at least one buffer amplifier 134, wherein every parallel branch of the sample and hold circuit comprises a sample switch 252a, 252b connecting the output 134a of the at least one buffer amplifier 134 to a sample capacitance 254a, 254b and a transfer switch 560a, 560b. Every transfer switch 560a, 560b of a parallel branch is itself electrically coupled to an evaluation means 470 via a further buffer amplifier 264. The sample switches 252a and 252b of the sample and hold circuit 550 are controlled such that they are closed in two different overlapping detection periods, so that different signals of a pixel sensor element are temporarily stored on every sample capacitance 252a, 252b of a parallel branch.

The buffer amplifiers 134 and 264 can be implemented, for example, as voltage followers in embodiments in order to buffer the photodiode or the sample and hold circuit. The voltage followers can thus act as impedance converter with an ideally infinitely large input resistance and a negligible output resistance.

In other embodiments of the present invention, the evaluation means 470 is implemented as a circuit for correlated double sampling. The circuit for correlated double sampling comprises an amplifier 280, wherein the output of the amplifier is connected to an input 280b via a reset switch 282. The circuit for correlated double sampling can have first 274a and second 274b sample capacitances connected in parallel, each electrically coupled to an input of the evaluation means 470a via first 572a and second 572b sample switches and connected to an input of the amplifier. In other embodiments, the circuit for correlated double sampling can also have only one sample capacitance 274 and/or one switch 572.

As shown in embodiments, the circuit for correlated double sampling can have first 284a and second 284b feedback capacitances connected in parallel, that are connected to the input of the amplifier 280b. Each of the feedback capacitances is connected to a reference potential 275 with its other terminal via the respective reference voltage switch 290a, b and to the output of the amplifier 280 via first 288a and second 288b amplifier switches. In other embodiments of the present invention, the optical distance measuring device or the apparatus for double sampling comprises a controller 580 that is implemented to close, in a first phase A, the first sample switch 572a of the evaluation means 470, the reset switch 282 and the reference voltage switch 290 such that a first signal applied to the input of the evaluation means 470 is formed on the first sample capacitance 274a. In a subsequent second time phase B, the first sample switch 572a is opened by the controller 580, the reset switch 282 remains closed, and the second sample switch 572b of the evaluation means is closed for forming a second signal on the second sample capacitance 274b. In a subsequent third time phase C, the controller can cause the first sample switch 572a and the first amplifier switch 288a to be closed and the second sample switch 572b and the reset switch 282 to be opened in order to apply a third signal to the first sample capacitance 274a such that a differential signal of the first and third signals is formed on the first feedback capacitance 284a. The controller 580 can be implemented such that in a fourth time phase D the second sample switch 572 and the second amplifier switch 288b are closed, so that a fourth signal is applied to the second sample capacitance 274b and a further differential signal is formed from the second and fourth signals on the second feedback capacitance 284b which is applied to the output 299.

As has been shown, for example in the context of FIG. 12, in embodiments, an optical distance measuring device can comprise a plurality of detection means 420 for detecting different amounts of radiation arranged in rows and columns. Further, the same can comprise a controller for controlling the rows and columns. The control logic or controller can be used, for example, for selecting the detection means in one row and for selecting or controlling the shutters or switches as well as the column address as described above. In one embodiment, an evaluation means 470, connected to the detection means 420 arranged in rows and columns via a read line 568, is associated to every column or every row of the pixel array, such that, based on the detected amounts of radiation, signals depending on the distance of the object to be measured are determined. The determined signals can then be provided for further processing row by row or, in other embodiments, also column by column or pixel by pixel. In another embodiment, an evaluation means 470 can be associated with every pixel.

In embodiments of the present invention, generally, an apparatus comprises a pixel sensor element 125a that performs a charging or discharging process depending on a measured quantity that can be detected at a pixel sensor element output 134a. Additionally, the apparatus can comprise at least one voltage follower 134, as well as first and second sample capacitances 252a, 254b as well as first and second switches 252a and 252b, connecting the first 254a or the second 254b sample capacitance in parallel to the pixel sensor element output via the at least one voltage follower 134. Further, an apparatus according to an embodiment of the present invention can comprise a controller implemented to control the first and second switches 252a and 252b such that the first switch is closed in a first time window and the second switch is closed in a second time window, wherein the first time window 304 and the second time window 314 temporally overlap such that, at the end of the first 304 and second time window 314, different voltage signals $U_1$, $U_2$ describing the charge or discharge process of the capacitive pixel sensor element 125a are applied to the sample capacitances 254a and 254b.

In embodiments of the present invention, the measured quantity causing a charge or discharge process of the pixel sensor element is frequently a pulsed radiation. In other embodiments of the present invention, however, other measured quantities, which generally cause a capacitive sensor element to perform a charge or discharge process, can be detected with apparatuses and methods for correlated double sampling described in the embodiments.

The apparatuses or the method for correlated double sampling described in the embodiments can also be used, for example, in other fields of image capturing or distance measurement.

A usage of the correlated double sampling method illustrated in the present invention is also possible in resistive, inductive, capacitive, piezoelectric, magnetic-field or temperature sensors. Generally, the inventive correlated double sampling method or the apparatus for double sampling can be used in wide fields of measurement technology or measurement value detection.

According to a further embodiment of the present invention, the pixel sensor element 125a can be implemented as PN diode, as photogate, as so-called charged coupled device (CCD), as PIN diode, as CCD photogate, as photonic mixer, as N well photodiode or, for example, also as pinned photodiode. The pixel sensor element can therefore be implemented as a capacitive pixel sensor element, wherein a charge or discharge process is performed based on a radiation interacting with the capacitive pixel sensor element or generally a measured quantity.

In another embodiment, the controller 580 can be implemented such that the first switch 252a for the first time window 314 and the second switch 252b for the second time window 316 are closed simultaneously at the beginning of the charge or discharge process in dependence on the measured quantity, wherein the duration 304a of the first time window is shorter than the second duration 316a of the second time window. The duration of the first time window can correspond, for example, to an interaction period of a measured quantity, depending on which a capacitive pixel sensor element performs a charge or discharge process.

An evaluation means 470 can, for example, also be implemented such that differential signals are determined based on two voltage signals applied one after the other to the first 274a and second 274b sample capacitances.

In one embodiment, the apparatus can have a capacitive pixel sensor element performing a charge or discharge process in dependence on a measured quantity that can be detected at a pixel sensor element output 134a. Additionally, the apparatus can comprise at least one voltage follower 134, first 254a and second 254b sample capacitances, first 252a and second 252b switches connecting the first or second sample capacitance in parallel to the pixel sensor element output 134a via the at least one voltage follower. Further, an inventive apparatus can also have a controller 580 implemented to control first 252a and second 252b switches such that the first switch is closed in a first time window 314 and the second switch is closed in a second time window 316, wherein the first time window and the second time window overlap in time, such that at the end of the first and second time windows different voltage signals describing the charge and discharge process of the capacitive pixel sensor element are applied to the sample capacitances. The apparatus can further comprise an evaluation means 470 having an amplifier 280, e.g. an operational amplifier, wherein the output 280a of the amplifier is connected to the input 280b of the amplifier via a reset switch 282. Further, the evaluation means can comprise third 274a and fourth 274b sample capacitances that are electrically coupled in parallel to first 254a and second 254b sample capacitances via third 572a and fourth 572b switches and are coupled to the input 280b of the amplifier. The evaluation means 470 can further have first 284a and second 284b feedback capacitances connected in parallel that can be connected to the input of the amplifier and, via a reference voltage switch 290a,b to a reference potential 275 and, via first 288a and second 288b amplifier switches, to the output 280a of the amplifier. Thereby, in this embodiment, the controller 580 can be implemented to control the first, second, third and fourth switches as well as the reset switch, the reference voltage switch and the amplifier switches such that the evaluation means determines two differential voltage signals in four successive phases. Thus, the differential voltage signals are determined by subtraction. A distance measurement device can have two feedback capacitances connected in parallel per pixel and can thus have double the amount of feedback capacitances as the pixel array of the distance measuring device has rows.

It is also possible that a double sampling system comprises a plurality of apparatuses that have, as described above, a capacitive pixel sensor element, at least one voltage follower, first and second sample capacitances with first and second switches and a controller. The plurality of these apparatuses can be arranged in rows and columns of a matrix, wherein one evaluation means 470 is associated with every row or every column of the matrix that can be controlled with the help of a controller and can be electrically coupled, via a read line, to the voltage signals at the sample capacitances describing the charge or discharge process of the capacitive pixel sensor elements.

In one embodiment, an optical distance measuring device according to the present invention comprises a photodiode structure having a photodiode capacitance for accumulating charge carriers in response to electromagnetic radiation, two readout capacitances, a reset means for resetting the readout capacitances by applying a predetermined voltage to the readout capacitances, a switching means for connecting the photodiode structure to the readout capacitances to transfer the accumulated charge carriers during two overlapping detection periods during a transfer phase determined by opening shutters 252a or 252b to the readout capacitances, and for separating the photodiode structure from the readout capacitances after the accumulation phases or after their respective overlapping detection periods in the radiation pulse period and in the dark period, and a readout or evaluation means for reading out the readout capacitances, wherein the readout means is implemented to read out the readout capacitance for a first time during the accumulation phase in the radiation pulse period and a second time during an accumulation phase in the dark period to obtain first and second readout values from the first and second overlapping detection periods, and to combine the values to obtain two readout results.

The present invention can enable noise reduction if readout capacitances are associated with a photodiode structure with a photodiode capacitance separated from the photodiode structure by a switch means and if a readout or evaluation means is provided which, for obtaining readout results, does not read out a readout value from the readout capacities only after the accumulation phase in the radiation pulse period, but also once after the accumulation phase in the dark period to combine the two readout values, such as, e.g., to calculate the difference such that the reset noise that can arise when resetting the readout capacitances can be reduced or eliminated from the readout results.

According to an embodiment of the present invention, the photodiode structure can be formed of a pinned photodiode whose space charge region can be depleted, which has in particular the advantage that, in a pinned photodiode, the light-sensitive p-n-transition is not covered by a metal electrode and is close to the surface, so that a pinned photodiode shows a higher sensitivity.

According to a further embodiment of the present invention, a first readout of the first two readout values takes place in a radiation pulse period immediately after resetting the readout capacitances, wherein the second readout takes place after the end of the accumulation phase or in a subsequent transfer phase in the dark period. For this purpose, the voltage state of a readout capacitance can be read out at any time such that the state of the readout capacitance in the readout process does not change. Additionally, the read-out voltage states of the readout or sample capacitances can be temporarily stored in an analog or also in a digitalized manner. Thereby, the portion of the reset noise of the final readout result is corrected in that the temporarily stored readout values are subtracted from each other at the end of a complete readout cycle, so that the contribution of the reset noise is eliminated or at least reduced in the final readout result.

In a further embodiment of the present invention, capturing a sequence of several subsequent light pulses is enabled without having to trigger a reset event of the readout capacitance after every light pulse. For this purpose, at the beginning of the charge accumulation of a first accumulation phase in the radiation pulse period, the readout capacitances are reset, immediately after that the state of the readout capacitances will be read out and stored for the first time. After terminating the first charge accumulation phase, the accumulated charge is transferred from the photodiode to the readout capacitances. Without having to reset the readout capacitances, the photodiode can start a new accumulation cycle in the dark period, since its space charge region has been restored by the depletion due to the reset. At the end of the first accumulation cycle, transfer of the photo charges to the readout capacitance takes place again. This process can basically be repeated as often as desired, wherein it has to be ensured that the precharged readout or sample capacitance is further discharged in every charge transfer by the accumulated charges in the photodiode, so that the maximum number of accumulation phases to be captured results from the size of the readout capacitance and the reset potential. This is called full well capacity. At the end of the last accumulation phase, the voltage state of the readout capacitance is read out a second time and also temporarily stored, the final readout result results by calculating the difference of the second readout result and the first readout result and is again freed from the noise portion. An optical distance measuring device operated in that manner contributes to a significant improvement of the signal/noise ratio, and can be realized with a standard CMOS structure. Several subsequent accumulation phases become possible without having to trigger a reset event or pixel reset after every single accumulation phase, which would deteriorate the signal/noise ratio again due to the unavoidable noise contribution.

In one embodiment, the pixel sensor element can have a pinned photodiode. The same can operate as follows. Prior to distance measurement, an n well of the pinned photodiode is depleted, so that, at the p-n-transition, a so-called "pin potential" $U_{PD}=U_{pin}$ appears across the barrier layer capacitance. For this purpose, first, the readout or sample capacitances are set to the potential of the supply or reset voltage $V_{reset}$ by means of a reset signal. Then, the actual depletion of the n well of the pinned photodiode is performed by closing the switch 252a,b, whereby charges still stored on the photodiode capacitance 132 flow off towards the readout capacitances. With the falling edge of a signal for closing the shutter 252a a charge accumulation phase starts, in which the photogenerated charge carriers are accumulated in the space charge region of the pinned photodiode and the potential at the photodiode capacitance decreases from the start potential $U_{pin}$ proportionately to the detected amount of light. After opening switches 252a,b, i.e. after terminating the integration, voltages proportional to the photogenerated charge carriers are applied to the readout capacitances.

It should also be noted that, depending on the circumstances, the inventive method can also be implemented in software. Implementation can also be performed on a digital memory medium, in particular a disc, a CD or a DVD having electronically readable memory signals that can cooperate with a programmable computer system and/or a microcontroller such that the respective method is performed.

Generally, the invention hence also consists in a computer program product with a program code for performing the inventive method stored on a machine-readable carrier when the computer program product runs on a computer and/or microcontroller and/or a digital signal processor DSP. In other words, the invention can be realized as a computer program having a program code for performing the method when the computer program runs on a computer and/or a microcontroller.

Generally, the methods or apparatuses presented in this invention can also be applied in fields of application outside 3D distance measurement or 3D image capturing.

The detection principle presented in embodiments does not use conventional serial 3D measurement value capturing, but a parallel method which has advantages, as has been described above. For example, the laser energy necessitated for the measurement can be reduced by half and the measurement speed and object resolution can be improved, since a laser recovery time or a recovery time for a pulsed radiation source, that can be several milliseconds depending on the emitted power, does not have to be maintained. This opens up new fields of application for three-dimensional distance measurement sensor technology and image capturing with pulsed light in general. For example, for high-speed cameras operating according to the method described herein, it is possible to follow the trajectory of flying objects with high speed, such as rockets or projectiles. Also, it is possible for distance cameras in vehicles to be substantially more robust and hence to be better able to reliably keep a distance to another vehicle or, for example, a pedestrian. Existing 3D measurement systems operating, for example, with laser light in the spectral range of 900 nanometers would necessitate a much higher pulse energy since two pulses are necessitated for reliably determining the distance. It is also possible that, when maintaining the used laser energy of the standard method, alternatively the laser power associated with the width of the integration period can be increased. This increases the signal/noise ratio between the laser and the background light and hence the measurement resolution. In other words, the laser pulse performance can be increased and hence the measurement resolution can be improved, wherein the overall laser energy used for the measurement can be maintained. Compared to conventional existing applications, the improvement in the signal/noise ratio is given approximately by the ratio of the laser energies. In an 0.35 micrometer standard CMOS production process, three-dimensional arrays or matrices having approximately 2,000 pixels can, for example, be integrated with an edge length of 100 to 200 micrometers.

According to another aspect of the present invention, the described method or the apparatus can also be used in two-dimensional CMOS image sensors. The double-shutter method, as described above, enables differential image applications in the two-dimensional range operating with active pulsed lighting.

In 3D pictures, reflectance correction can be realized on a system level by means of double-shutter methods, whereby a differentiation is made between correction calculations "on-chip", i.e. on the image sensor, and "off-chip", i.e. not on the image sensor (software, firmware). This procedure can also be applied to the double-shutter method as presented in this invention. Therewith, it is possible, in addition to the simple subtractive background light correction, to realize also the reflectance correction either close to the hardware on the sensor chip and/or in a system comprising the sensor chip, in a computer program or software.

In embodiments, digitalization of the detected voltage signals can take place directly after the sample and hold circuit 550 and a subsequent subtraction and/or division of these digital values is also performed "on-chip". Also, these digitalized voltage values can be subtracted and/or divided externally, for example in the camera system or in a computer, in order to perform the distance calculation. The subtraction of the voltage values detected by the sample and hold circuit can, therefore, be performed in other embodiments in a different way to that of the CDS stage, namely, for example, digitally "on-chip" or externally.

In another embodiment, the differential voltage values at the output of the evaluation means 470 or the CDS stage can be digitalized "on-chip", and correspondingly an "on-chip" division can be performed after the CDS stage to determine the distance value. The division of these digital values can also be performed again externally, for example in a camera system or in a computer.

In embodiments, the radiation pulse can have a variable starting point with regard to the integration windows, i.e. a variable time offset. The integration windows or the detection periods can, therefore, start with an adjustable known time offset or phase-locked to each other.

Between the shutter signals for opening and closing the time windows for detecting the voltage signals and the signal for starting the radiation pulse a delay line can, for example, be inserted in a functional manner in order to allow time-variable and, hence, distance-variable phase-locked starting of the time windows and the radiation pulse. If, for example, an object is far away, a delay line having an adjustable defined duration can compensate this respective runtime until the start of the time window. The detection periods for detecting the amounts of radiation, i.e. the integration windows, can have a variable integration time that can, for example, be adjusted and controlled by a controller and are, hence, known.

As shown in embodiments, the voltage values detected and temporarily stored by the sample and hold circuit can be serially subtracted in the CDS stage, or, if the CDS stage comprises a second operational amplifier, also be completely processed in parallel. As has been shown in embodiments, the CDS stage can also have, for example, only one operational amplifier and the respective sample capacitances 274 and feedback capacitances 284 can still be implemented in parallel. This enables temporary storage of the voltage values detected in overlapping detection periods in the CDS stage for the subtraction of the detected voltage values performed in the CDS stage.

In embodiments of the present invention, an evaluation means or a CDS stage 470 can be associated with a row or column of a pixel array of a sensor 420, or every pixel has an associated CDS stage.

It should be noted that the buffer amplifiers 134 and 264 in the embodiments can also be amplifiers with a buffer effect having an amplification of more than ×1. The buffer amplifiers 134 and 264 therefore do not necessarily have to be implemented as voltage followers or source followers. For an improved signal/noise ratio it can, for example, be advantageous to amplify the voltage signal of the pixel element 125a as early as possible in the signal path. This can be achieved by using a buffer amplifier as a buffer 134 allowing an amplification of more than ×1 and a respective buffering of the voltage at the photodiode. The buffer 134 and 264 can, for example, be an operational amplifier having an amplification of more than ×1 and an appropriate buffer effect.

In comparison to conventional methods, the methods described in the embodiments can achieve a significantly higher correlation of distance and reflectance measurements by multiple accumulation. Thereby, for example, fast-moving objects can be detected better and reduced "blurring" of the object can be obtained.

While this invention has been described in terms of several advantageous embodiments, there are alterations, permutations, and equivalents which fall within the scope of this invention. It should also be noted that there are many alternative ways of implementing the methods and compositions of the present invention. It is therefore intended that the following appended claims be interpreted as including all such alterations, permutations, and equivalents as fall within the true spirit and scope of the present invention.

The invention claimed is:

1. An optical distance measuring device comprising:
   a pulsed radiation source implemented to transmit, in a temporally contiguous radiation pulse period, a radiation pulse with a pulse duration that is shorter than the radiation pulse period, and to transmit no radiation pulse in a temporally contiguous dark period;
   a detector for detecting different amounts of radiation in, starting in, a phase-locked manner with the radiation pulse, two overlapping detection periods during the radiation pulse period to capture reflections of the radiation pulse at a surface of an object and a background radiation and in two detection periods during the dark period to capture a background radiation; and
   an evaluator determining a signal depending on a distance of the optical distance measuring device to the object, based on the detected amounts of radiation by determining processed signals from the different amount of radiations detected in the two overlapping detection periods during the radiation pulse period, and from the different amount of radiations detected in the two detection periods during the dark period.

2. A method for optical distance measurement, comprising:
   emitting a radiation pulse with a pulsed radiation source implemented to transmit, in a temporally contiguous radiation pulse period, a radiation pulse with a pulse duration $t_p$ that is shorter than the radiation pulse period, and to transmit no radiation pulse in a temporally contiguous dark period;
   detecting different amounts of radiation with a detector that is implemented to capture reflections of the radiation pulse at a surface of an object and background radiation in two overlapping detection periods during the radiation pulse period and to capture background radiation in two overlapping detection periods during the dark period; and
   determining a signal depending on a distance to be measured based on the detected amounts of radiation, wherein emitting the radiation pulse with a pulse duration $t_p$ and detecting the different amounts of radiation in two overlapping detection periods during the radiation pulse period starts phase-locked with emitting the radiation pulse, wherein a first of the two detection periods comprises the pulse duration $t_p$ and the second of the two detection periods comprises a duration $t_{int2}$ that is longer than $t_p$ and wherein detecting the different amounts of radiation in two detection periods during the dark period is performed prior to or after the radiation pulse period.

3. An optical distance measuring device comprising:
   a pulsed radiation source implemented to transmit, in a temporally contiguous radiation pulse period, a radiation pulse with a pulse duration that is shorter than the radiation pulse period, and to transmit no radiation pulse in a temporally contiguous dark period;
   a detector for detecting different amounts of radiation in, starting in a phase-locked manner with the radiation pulse, two overlapping detection periods during the radiation pulse period to capture reflections of the radiation pulse at a surface of an object and a background radiation an amount of radiation in at least one detection period during the dark period to capture a background radiation; and
   an evaluator determining a signal depending on a distance of the optical distance measuring device to the object, based on the detected amounts of radiation by determining a processed signal from the different amount of radiations detected in the two overlapping detection periods during the radiation pulse period, and using the amount of radiation detected in the at least one detection period during the dark period.

4. The optical distance measuring device according to claim 1, wherein the detector is implemented such that the two overlapping radiation pulse detection periods during the radiation pulse period start phase-locked with the radiation pulse, wherein a first of the two radiation pulse detection periods during the radiation pulse period comprises a first duration and a second of the two radiation pulse detection periods during the radiation pulse period comprises a second duration, which is longer than a pulse duration of the radiation pulse, and such that the two overlapping dark detection periods during the dark period start phase-locked after the termination of the radiation pulse period, wherein a first of the two dark detection periods during the dark period comprises a third duration, which corresponds to the first duration, and a second of the two dark detection periods during the dark period comprises a fourth duration, which corresponds to the second duration.

5. The optical distance measuring device according to claim 1, wherein the detector is implemented such that the two overlapping radiation pulse detection periods during the radiation pulse period start phase-locked with the radiation pulse of the pulsed radiation source, wherein a first of the two radiation pulse detection periods during the radiation pulse period comprises a first duration and a second of the two radiation pulse detection periods during the radiation pulse period comprises a second duration, which is longer than a pulse duration of the radiation pulse, and such that the two overlapping dark detection periods during the dark period start prior to or after the termination of the radiation pulse period, wherein a first of the two dark detection periods during the dark period comprises a third duration, which differs from the first duration, and a second of the two dark detection periods during the dark period comprises a fourth duration that differs from the second duration.

6. The optical distance measuring device according to claim 1, wherein the detector is implemented such that the two overlapping detection periods during the radiation pulse period comprise a variable time offset with respect to the radiation pulse of the pulsed radiation source.

7. The optical distance measuring device according to claim 1, wherein the evaluator is implemented such that a detected signal is a differential signal generated by subtracting temporarily stored signals describing the different amounts of radiation detected during the radiation pulse period in the two overlapping detection periods, and signals describing the different amounts of radiation detected during the dark period in the two overlapping detection periods.

8. The optical distance measuring device according to claim 1, wherein the pulsed radiation source is a laser or an LED emitting electromagnetic radiations in the ultraviolet (UV), visible (VIS), infrared (IR) or far-infrared (FIR) spectral range.

9. The optical distance measuring device according to claim 1, wherein the detector is a pixel sensor element providing signals at a pixel sensor element output in dependence on the detected amounts of radiation, wherein the pixel sensor element output is connected to a sample and hold circuit implemented in parallel via at least one buffer amplifier, wherein every parallel branch of the sample and hold circuit comprises a sample switch connecting the output of the at least one buffer amplifier to a sample capacitance and a transfer switch, wherein, by the transfer switch, every parallel branch of the sample and hold circuit is connectable to the evaluator, and wherein the sample switch in every parallel branch is implemented such as to be closed in two overlapping detection periods, so that after terminating the overlapping detection periods a different signal of the pixel sensor element output is temporarily stored on every sample capacitance of the parallel branch.

10. The optical distance measuring device according to claim 1, wherein the detector is a pixel sensor element providing signals at a pixel sensor element output in dependence on the detected amounts of radiation, wherein the pixel sensor element output is connected to a selection switch of a sample and hold circuit via at least one buffer amplifier, wherein the sample and hold circuit comprises at least two sample capacitances that can be coupled to the input and output of the sample and hold circuit via one sample switch each, and wherein the sample switch is implemented such as to be closed in two temporally different detection periods, so that after terminating the detection periods a different signal of the pixel sensor element output is temporarily stored on each of the at least two sample capacitances.

11. The optical distance measuring device according to claim 10, wherein the buffer amplifier is implemented as a voltage follower or as an operational amplifier for amplification.

12. The optical distance measuring device according to claim 1, wherein the detector comprises a PN photodiode, a PIN photodiode, a pinned photodiode, a photogate, an N-well photodiode, a CCD photogate or a photonic mixer that is implemented to detect the different amounts of radiation in two overlapping detection periods.

13. The optical distance measuring device according to claim 1, wherein the evaluator comprises a circuit for correlated double sampling, comprising:
an amplifier, wherein the output of the amplifier can be connected to an input of the amplifier via a reset switch;
a sample capacitance that can be connected to an input of the evaluator and an input of the amplifier via a sample switch;
first and second feedback capacitances connected in parallel that can each be connected to an input of the amplifier and to a reference potential via a reference voltage switch, and to the output of the amplifier via first and second amplifier switches;
a controller implemented to switch the reset switch, the sample switch, the reference voltage switch and the first and second amplifier switches such as to subtract the signals applied to an input of the evaluator from each other in a serial sequence and to provide the respective differential signals at the output.

14. The optical distance measuring device according to claim 1 comprising a plurality of detectors for detecting different amounts of radiation and a controller for controlling a pixel array, wherein an evaluator that can be connected to the detectors via a read line is associated with every pixel array or every pixel, such that the evaluators determine, based on the amount of radiation detected with the detectors, signals depending on the distance of the optical distance measuring device to the object, and wherein the signals are provided to a pixel array or pixel by pixel for further processing.

15. The optical distance measuring device according to claim 1, wherein the signal provided by the evaluator can be digitalized "on-chip", and a subsequent division of the digital values for determining the distance can be performed "on-chip".

16. A method for optical distance measurement, comprising:
emitting a radiation pulse with a pulsed radiation source implemented to transmit, in a temporally contiguous radiation pulse period, a radiation pulse with a pulse duration $t_p$ that is shorter than the radiation pulse period, and to transmit no radiation pulse in a temporally contiguous dark period;
detecting different amounts of radiation with a detector that is implemented to capture reflections of the radiation pulse at a surface of an object and background radiation in two overlapping detection periods during the radiation pulse period or to capture background radiation in two overlapping detection periods during the dark period; and
determining a signal depending on a distance to be measured based on the detected amounts of radiation with a circuit for correlated double sampling such that processed signals are determined from the reflections and background radiations detected in the two overlapping detection periods during the radiation pulse period, and from the background radiations detected in the two detection periods during the dark period.

17. The method for optical distance measurement according to claim 2, wherein emitting a radiation pulse is performed such that a pulsed laser beam or LED beam is emitted.

18. A method for optical distance measurement, comprising:
emitting a radiation pulse with a pulsed radiation source implemented to transmit, in a temporally contiguous radiation pulse period, a radiation pulse with a pulse duration $t_p$ that is shorter than the radiation pulse period, and to transmit no radiation pulse in a temporally contiguous dark period;
detecting different amounts of radiation with a detector that is implemented to capture reflections of the radiation pulse at an object surface and background radiation in two overlapping detection periods during the radiation pulse period or to capture background radiation in two overlapping detection periods during the dark period; and
determining a signal depending on a distance to be measured based on the detected amounts of radiation, wherein the emitting the radiation pulse is performed with a pulse duration $t_p$ and the detecting the different amounts of radiation in two overlapping detection periods during the radiation pulse period starts phase-locked with emitting the radiation pulse, wherein a first of the two detection periods comprises the pulse duration $t_p$ and the second of the two detection periods comprises a duration $t_{int2}$ that is longer than $t_p$ or wherein detecting the different amounts of radiation in two detection periods during the dark period is performed prior to or after the radiation pulse period.

19. The method according to claim 2, wherein detecting different amounts of radiation with a detector is performed such that two amounts of charge or voltage values depending on the amount of radiation detected in the two overlapping detection periods are temporarily stored in the detector and signals depending on a distance to the object to be measured are determined based on the temporarily stored amounts of charge or voltage values.

20. The method according to claim 16, wherein detecting is performed such that the background radiation in two detection periods in a dark period is detected simultaneously for all detectors of a sensor prior to the radiation pulse period.

21. The method according to claim 20, wherein the background radiation is extrapolated based on the detected background radiation in the two detection periods during the dark period, and the distance to the object to be measured is determined based on the extrapolation values.

22. A non-transitory computer-readable storage medium having stored thereon a computer program comprising a program code for performing a method for optical distance measurement, the method comprising:
   emitting a radiation pulse with a pulsed radiation source implemented to transmit, in a temporally contiguous radiation pulse period, a radiation pulse with a pulse duration $t_p$ that is shorter than the radiation pulse period, and to transmit no radiation pulse in a temporally contiguous dark period;
   detecting different amounts of radiation with a detector that is implemented to capture reflections of the radiation pulse at a surface of an object and background radiation in two overlapping detection periods during the radiation pulse period or to capture background radiation in two overlapping detection periods during the dark period; and
   determining a signal depending on distance to be measured based on the detected amounts of radiation,
   wherein the program code is performed on a computer, a microcontroller or a digital signal processor.

23. An optical distance measuring device comprising:
   a pulsed radiation source implemented to transmit, in a temporally contiguous radiation pulse period, a radiation pulse with a pulse duration that is shorter than the radiation pulse period, and to transmit no radiation pulse in a temporally contiguous dark period;
   a detector for detecting different amounts of radiation in two overlapping detection periods during the radiation pulse period to capture reflections of the radiation pulse at a surface of an object and a background radiation or in two overlapping detection periods during the dark period to capture a background radiation; and
   an evaluator determining a signal depending on a distance of the optical distance measuring device to the object, based on the detected amounts of radiation,
   wherein the detector is implemented such that the two overlapping radiation pulse detection periods during the radiation pulse period start phase-locked with the radiation pulse, wherein a first of the two radiation pulse detection periods during the radiation pulse period comprises a first duration and a second of the two radiation pulse detection periods during the radiation pulse period comprises a second duration, which is longer than a pulse duration of the radiation pulse, and such that the two overlapping dark detection periods during the dark period start phase-locked after the termination of the radiation pulse period, wherein a first of the two dark detection periods during the dark period comprises a third duration, which corresponds to the first duration, and a second of the two dark detection periods during the dark period comprises a fourth duration, which corresponds to the second duration.

24. An optical distance measuring device comprising:
   a pulsed radiation source implemented to transmit, in a temporally contiguous radiation pulse period, a radiation pulse with a pulse duration that is shorter than the radiation pulse period, and to transmit no radiation pulse in a temporally contiguous dark period;
   a detector for detecting different amounts of radiation in two overlapping detection periods during the radiation pulse period to capture reflections of the radiation pulse at a surface of an object and a background radiation or in two overlapping detection periods during the dark period to capture a background radiation; and
   an evaluator determining a signal depending on a distance of the optical distance measuring device to the object, based on the detected amounts of radiation,
   wherein the detector is implemented such that the two overlapping radiation pulse detection periods during the radiation pulse period start phase-locked with the radiation pulse of the pulsed radiation source, wherein a first of the two radiation pulse detection periods during the radiation pulse period comprises a first duration and a second of the two radiation pulse detection periods during the radiation pulse period comprises a second duration, which is longer than a pulse duration of the radiation pulse, and such that the two overlapping dark detection periods during the dark period start prior to or after the termination of the radiation pulse period, wherein a first of the two dark detection periods during the dark period comprises a third duration, which differs from the first duration, and a second of the two dark detection periods during the dark period comprises a fourth duration that differs from the second duration.

* * * * *